US011975540B2

(12) United States Patent
Mine

(10) Patent No.: US 11,975,540 B2
(45) Date of Patent: May 7, 2024

(54) HEAD CHIP, LIQUID JET HEAD, LIQUID JET RECORDING DEVICE, AND METHOD OF MANUFACTURING HEAD CHIP

(71) Applicant: SII Printek Inc., Chiba (JP)

(72) Inventor: Tooru Mine, Chiba (JP)

(73) Assignee: SII PRINTEK INC., Chiba (JP)

( * ) Notice: Subject to any disclaimer, the term of this patent is extended or adjusted under 35 U.S.C. 154(b) by 97 days.

(21) Appl. No.: 17/964,416

(22) Filed: Oct. 12, 2022

(65) Prior Publication Data

US 2023/0117809 A1 Apr. 20, 2023

(30) Foreign Application Priority Data

Oct. 14, 2021 (JP) ................................ 2021-168618

(51) Int. Cl.
*B41J 2/14* (2006.01)
*B41J 2/16* (2006.01)

(52) U.S. Cl.
CPC ......... *B41J 2/14274* (2013.01); *B41J 2/1612* (2013.01); *B41J 2/1623* (2013.01); *B41J 2002/14306* (2013.01)

(58) Field of Classification Search
CPC .. B41J 2/14209; B41J 2/14274; B41J 2/1433; B41J 2/1609; B41J 2/1612; B41J 2/1623; B41J 2/1632; B41J 2/1634; B41J 2002/14306
See application file for complete search history.

(56) References Cited

U.S. PATENT DOCUMENTS

2019/0061350 A1 2/2019 Irokawa
2023/0120427 A1 * 4/2023 Mine ...................... B41J 2/1642
347/20

FOREIGN PATENT DOCUMENTS

JP 2019-42979 A 3/2019

* cited by examiner

*Primary Examiner* — Anh T Vo
(74) *Attorney, Agent, or Firm* — Crowell & Moring LLP

(57) ABSTRACT

A head chip prevented from deteriorating in printing quality is provided. The head chip is provided with an intermediate plate which has a plurality of columns of communication hole groups for each channel column, the communication hole group having communication holes individually communicated with ejection channels of an actuator plate and arranged in a line in an X direction. The communication holes adjacent to each other in the X direction are arranged so as to be shifted in a Y direction from each other. The intermediate plate is provided with a non-penetrating groove closed by a nozzle plate, and a penetrating hole communicated with the non-penetrating groove, and communicated with an outside of the head chip through a non-ejection channel. A part of the non-penetrating groove is located in an inter-communication hole region. A minimum gap in the X direction between an opening edge of the communication hole and the non-penetrating groove in the inter-communication hole region is larger than a minimum gap in the X direction between the opening edge of the communication hole and the non-ejection channel.

10 Claims, 14 Drawing Sheets

HEAD CHIP, LIQUID JET HEAD, LIQUID JET RECORDING DEVICE, AND METHOD OF MANUFACTURING HEAD CHIP

RELATED APPLICATIONS

This application claims priority to Japanese Patent Application No. 2021-168618, filed on Oct. 14, 2021, the entire content of which is incorporated herein by reference.

BACKGROUND OF THE INVENTION

1. Field of the Invention

The present disclosure relates to a head chip, a liquid jet head, a liquid jet recording device, and a method of manufacturing a head chip.

2. Description of the Related Art

An inkjet head to be installed in an inkjet printer ejects ink to a recording target medium through a head chip installed in the inkjet head. The head chip is provided with an actuator plate having ejection channels and non-ejection channels formed alternately, and a nozzle plate bonded to the actuator plate and provided with nozzle holes from which ink housed in the ejection channels is jetted, and which are disposed at positions corresponding to the respective ejection channels.

In recent years, due to the progress of reduction in groove size of the channel, the allowable range of displacement of the actuator plate and the nozzle plate decreases. Specifically, when the position of the nozzle plate with respect to the actuator plate is shifted in a width direction of the channel, there is a possibility that a part of the opening at the channel side of the nozzle hole is blocked by a wall between the channels. When a part of the opening at the channel side of the nozzle hole is blocked, supply of the ink to the nozzle hole is hindered. Thus, there is a possibility that the jet characteristics of the ink deteriorate.

In JP-A-2019-42979, there is disclosed a configuration in which an intermediate plate provided with penetrating holes each communicated with both of the ejection channel and the nozzle hole is disposed between the actuator plate and the nozzle plate, and the penetrating holes are formed to have a size larger in the width direction of the ejection channel than the ejection channel and the nozzle hole. According to this configuration, since the displacement of the actuator plate and the nozzle plate is allowed within the range in which the nozzle hole is not blocked by the intermediate plate, it is possible to prevent the supply of the ink to the nozzle hole from being hindered.

Incidentally, when a bonding defect exists in a bonding portion between the intermediate plate and the nozzle plate, there is a possibility that the ejection channels are communicated with each other through the bonding defect portion. When the ejection channels are communicated with each other, pressure propagates through the bonding defect portion when ejecting the ink to induce a deviation of the jet direction of the ink in some cases. Thus, there is a possibility that the printing quality deteriorates.

However, when the nozzle plate is formed of an opaque material such as a metal material, it has been difficult to optically detect the bonding defect between the nozzle plate and the intermediate plate.

Therefore, the present disclosure provides a head chip, a liquid jet head, a liquid jet recording device, and a method of manufacturing a head chip in which the deterioration of the printing quality caused by the bonding defect between a jet orifice plate and the intermediate plate is prevented.

SUMMARY OF THE INVENTION

In view of the problems described above, the present disclosure adopts the following aspects.

(1) A head chip according to an aspect of the present disclosure is a head chip configured to jet liquid and including an actuator plate having a channel column in which jet channels and non-jet channels extending in a first direction are alternately arranged in a second direction crossing the first direction so as to overlap each other in the first direction, an intermediate plate which is made to overlap the actuator plate, and which has a plurality of columns of communication hole groups for each channel column, the communication hole group having communication holes individually communicated with the jet channels and arranged in a line in the second direction, and a jet orifice plate which is overlapped with the intermediate plate at an opposite side to the actuator plate, and is provided with jet orifices which are individually communicated with the communication holes, and from which the liquid contained in the jet channels is jetted, wherein the communication holes adjacent to each other in the second direction out of the communication holes included in the plurality of columns of communication hole groups are arranged so as to be shifted in the first direction from each other, the intermediate plate is provided with a non-penetrating groove which opens on a surface at a side of the jet orifice plate, and which is closed by the jet orifice plate, and a penetrating hole which is communicated with the non-penetrating groove, and which is communicated with an outside of the head chip through the non-jet channel, when defining a region between opening edges of a pair of the communication holes adjacent to each other in predetermined one of the communication hole groups in a surface at a side of the jet orifice plate in the intermediate plate as an inter-communication hole region, a part of the non-penetrating groove is located in the inter-communication hole region, and a minimum gap in the second direction between the opening edge of the communication hole and the non-penetrating groove in the inter-communication hole region is longer than a minimum gap in the second direction between the opening edge of the communication hole and the non-ejection channel.

According to the present aspect, the bonding defect portion between the intermediate plate and the jet orifice plate is coupled to the communication hole and the non-penetrating groove of the intermediate plate, and thus, the communication hole and the non-penetrating groove are communicated with each other via the bonding defect portion. Thus, the jet channel and the penetrating hole of the intermediate plate are communicated with each other. Since the penetrating hole is communicated with the outside of the head chip through the non-jet channels, by detecting the leakage when blocking the jet orifice and vacuuming the jet channel, it is possible to make the penetrating hole and the non-penetrating groove function as a flow channel for detecting the leakage that couples the bonding defect portion and the non-jet channel to each other to thereby detect the presence of the bonding defect portion. In particular, since the non-penetrating groove is located in the inter-communication hole region, the bonding defect portion in the inter-communication hole region can efficiently be detected. Moreover, since the non-penetrating groove does not open on the actuator plate side, it is possible to increase the degree of freedom of the shape of the flow channel for detecting the leakage compared to a configuration in which the flow channel for detecting the leakage is formed only of the penetrating hole.

Further, since the communication holes adjacent to each other in the second direction are shifted in the first direction from each other, when focusing attention on the pair of communication holes adjacent to each other in the second direction, unlike the configuration in which the communication holes are arranged in a line in the second direction, even when making the minimum gap between the opening edge of one of the communication holes and the non-penetrating groove longer than the minimum gap from the non-jet channel, it is possible to prevent the non-penetrating groove from coming closer to another of the communication holes. Thus, it is possible to increase the width in the second direction in the bonding portion between the intermediate plate and the jet orifice plate, and therefore, it is possible to more surely bond the intermediate plate and the jet orifice plate to each other.

Due to the above, it is possible to detect the bonding defect between the intermediate plate and the jet orifice plate to prevent the deterioration in printing quality caused by the bonding defect while suppressing the decrease in bonding margin between the intermediate plate and the jet orifice plate caused by disposing the non-penetrating groove.

(2) In the head chip according to the aspect (1) described above, it is possible that the non-penetrating groove extends throughout an entire length in the first direction of the inter-communication hole region.

According to the present aspect, the non-penetrating groove is disposed on the shortest path connecting the pair of communication holes across the inter-communication hole region. Thus, it is possible to detect the bonding defect which can induce the unintended communication between the jet channels in a part to which the fluid pressure is apt to be applied.

(3) In the head chip according to one of the aspects (1) and (2) described above, it is possible that the non-penetrating groove extends continuously from one of the inter-communication hole regions corresponding respectively to a pair of the communication hole groups adjacent in the first direction to each other to another of the inter-communication hole regions.

According to the present aspect, the non-penetrating groove is disposed on the shortest path connecting the pair of communication holes adjacent to each other in the second direction. Thus, it is possible to detect the bonding defect which can induce the unintended communication between the jet channels in a part to which the fluid pressure is apt to be applied.

(4) In the head chip according to any one of the aspects (1) through (3) described above, it is possible that the non-penetrating groove linearly extends throughout an entire length.

According to the present aspect, since the bending part is not formed, the non-penetrating groove can homogenously be formed throughout the entire length, and thus, it is possible to prevent an unintended penetration from occurring when forming the non-penetrating groove.

(5) In the head chip according to any one of the aspects (1) through (3) described above, it is possible that the non-penetrating groove linearly extends in the first direction in the inter-communication hole region.

According to the present aspect, it is possible to enlarge the minimum gap between both of the pair of communication holes across the inter-communication hole region and the non-penetrating groove compared to when the non-penetrating groove extends in a direction tilted with respect to the first direction in the inter-communication hole region. Therefore, it is possible to increase the width in the second direction in the bonding portion between the intermediate plate and the jet orifice plate.

(6) A liquid jet head according to an aspect of the present disclosure includes the head chip according to any of the aspects (1) through (5) described above.

According to the present aspect, since the head chip according to any of the aspects described above is provided, it is possible to provide the liquid jet head excellent in printing quality.

(7) A liquid jet recording device according to an aspect of the present disclosure includes the liquid jet head according to the aspect (6) described above.

According to the present aspect, since the liquid jet head according to the aspect described above is provided, it is possible to provide the liquid jet recording device excellent in printing quality.

(8) A method of manufacturing a head chip according to an aspect of the present disclosure is a method of manufacturing a head chip having an actuator plate having a channel column in which jet channels and non-jet channels extending in a first direction are alternately arranged in a second direction crossing the first direction so as to overlap each other in the first direction, an intermediate plate which is overlapped with the actuator plate, and which has a plurality of columns of communication hole groups for each channel column, the communication hole group having communication holes individually communicated with the jet channels and arranged in a line in the second direction, and a jet orifice plate which is overlapped with the intermediate plate at an opposite side to the actuator plate, and is provided with jet orifices which are individually communicated with the communication holes, and from which a liquid contained in the jet channels is jetted, wherein the communication holes adjacent to each other in the second direction out of the communication holes included in the plurality of columns of communication hole groups are arranged so as to be shifted in the first direction from each other, the method including a non-penetrating groove formation step of providing a non-penetrating groove to the intermediate plate, the non-penetrating groove opening on a surface at a side of the jet orifice plate and being closed by the jet orifice plate, and a penetrating hole formation step of providing a penetrating hole to the intermediate plate, the penetrating hole being communicated with the non-penetrating groove, and being communicated with an outside of the head chip through the non-jet channel, wherein when defining a region between opening edges of a pair of the communication holes adjacent to each other in predetermined one of the communication hole groups in a surface at a side of the jet orifice plate in the intermediate plate as an inter-communication hole region, in the non-penetrating groove formation step, a part of the non-penetrating groove is formed in the inter-communication hole region, and a minimum gap in the second direction between the opening edge of the communication hole and the non-penetrating groove in the inter-communication hole region is set longer than a minimum gap in the second direction between the opening edge of the communication hole and the non-ejection channel.

(9) In the method of manufacturing the head chip according to the aspect (8) described above, it is preferable to further include an intermediate plate bonding step of bonding the intermediate plate to the actuator plate, wherein the penetrating hole formation step is performed after the intermediate plate bonding step.

According to the present aspect, it is possible to form the penetrating hole at the desired position with respect to the non-jet channel in the penetrating hole formation step irrespective of the alignment accuracy between the actuator plate and the intermediate plate. Therefore, in the head chip provided with the intermediate plate provided with the penetrating hole communicated with the non-jet channel, it is possible to achieve an increase in fabrication yield. It is possible to increase the positional accuracy between the non-jet channel and the penetrating hole.

(10) In the method of manufacturing the head chip according to one of the aspects (8) and (9) described above, it is preferable to further include an intermediate plate bonding step of bonding the intermediate plate to the actuator plate, wherein the intermediate plate bonding step is performed after the non-penetrating groove formation step.

According to the present aspect, it is possible to perform the step of providing the non-penetrating groove to the intermediate plate in parallel to a step to be performed prior to the intermediate plate bonding step in the head chip manufacturing. Therefore, it is possible to shorten the manufacturing period of the head chip.

According to an aspect of the present disclosure, it is possible to prevent the deterioration of the printing quality.

DETAILED DESCRIPTION OF THE PREFERRED EMBODIMENTS

Some embodiments according to the present disclosure will hereinafter be described with reference to the drawings. It should be noted that in the following description, constituents having the same functions or similar functions are denoted by the same reference symbols. Further, the redundant descriptions of those constituents are omitted in some cases.

Embodiments

<Printer>

A printer 1 common to the embodiments will be described.

Figure 1:
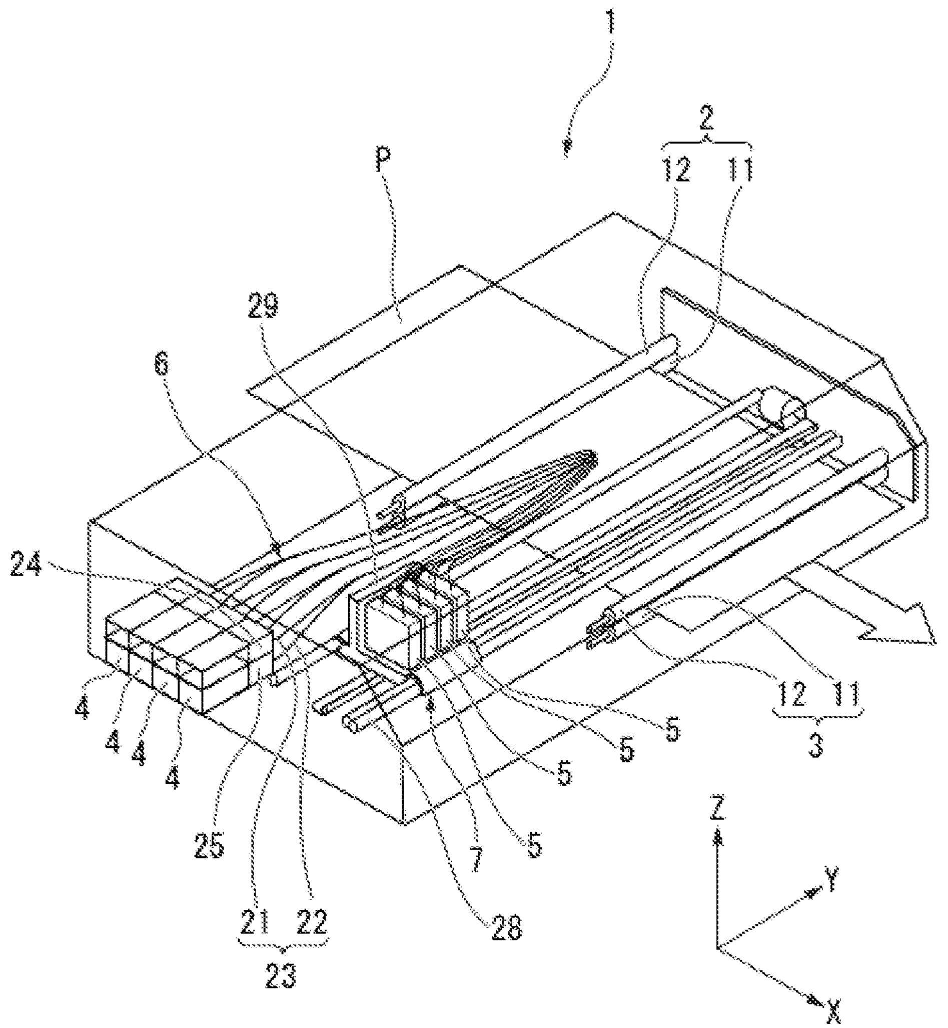
FIG. 1 is a schematic configuration diagram of a printer according to an embodiment.

FIG. 1 is a schematic configuration diagram of the printer according to the embodiments.

As shown in FIG. 1, the printer (a liquid jet recording device) 1 according to the present embodiments is provided with a pair of conveying mechanisms 2, 3, ink tanks 4, inkjet heads (liquid jet heads) 5, ink circulation mechanisms 6, and a scanning mechanism 7.

In the following explanation, the description is presented using an orthogonal coordinate system of X, Y, and Z as needed. In this case, an X direction (a second direction) coincides with a conveying direction (a sub-scanning direction) of a recording target medium P (e.g., paper). A Y direction (a first direction) coincides with a scanning direction (a main scanning direction) of the scanning mechanism 7. A Z direction represents a height direction (a vertical direction) perpendicular to the X direction and the Y direction. In the following explanation, the description will be presented defining an arrow side as a positive (+) side, and an opposite side to the arrow as a negative (−) side in the drawings in each of the X direction, the Y direction, and the Z direction. In the present embodiments, the +Z side corresponds to an upper side in the vertical direction, and the −Z side corresponds to a lower side in the vertical direction.

The conveying mechanisms 2, 3 convey the recording target medium P toward the +X side. The conveying mechanisms 2, 3 each include a pair of rollers 11, 12 extending in, for example, the Y direction.

The ink tanks 4 respectively house ink of four colors such as yellow, magenta, cyan, and black. The inkjet heads 5 are configured so as to be able to respectively eject the four colors of ink, namely the yellow ink, the magenta ink, the cyan ink, and the black ink in accordance with the ink tanks 4 coupled thereto. It should be noted that the ink to be housed in the ink tanks 4 can be conductive ink, or can also be nonconductive ink.

Figure 2:
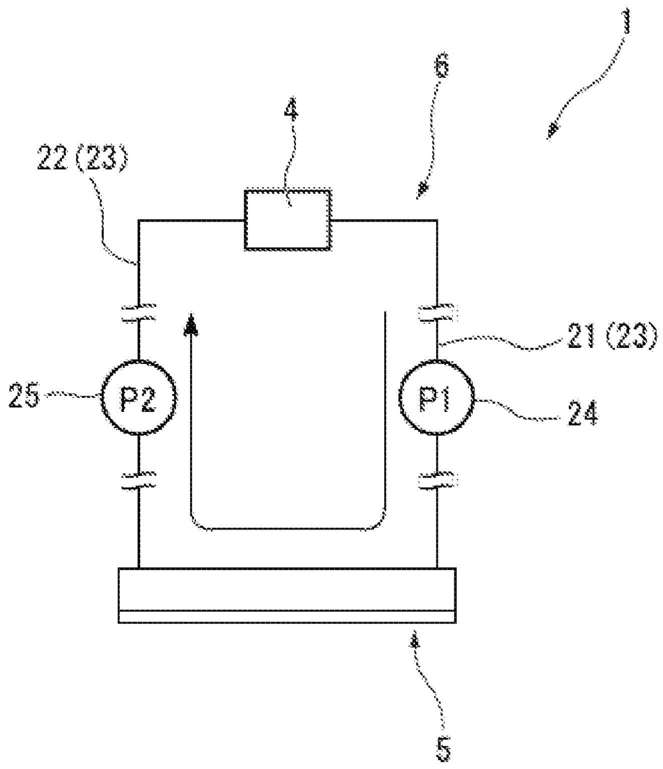
FIG. 2 is a schematic configuration diagram of an inkjet head and an ink circulation mechanism in the embodiment.

FIG. 2 is a schematic configuration diagram of the inkjet head and the ink circulation mechanism according to the embodiments.

As shown in FIG. 1 and FIG. 2, the ink circulation mechanism 6 circulates the ink between the ink tank 4 and the inkjet head 5. Specifically, the ink circulation mechanism 6 is provided with a circulation flow channel 23 having an ink supply tube 21 and an ink discharge tube 22, a pressure pump 24 coupled to the ink supply tube 21, and a suction pump 25 coupled to the ink discharge tube 22.

The pressure pump 24 pressurizes the inside of the ink supply tube 21 to deliver the ink to the inkjet head 5 through the ink supply tube 21. Thus, the ink supply tube 21 is provided with positive pressure with respect to the inkjet head 5.

The suction pump 25 depressurizes the inside of the ink discharge tube 22 to suction the ink from the inkjet head 5 through the ink discharge tube 22. Thus, the ink discharge tube 22 is provided with negative pressure with respect to the inkjet head 5. It is arranged that the ink can circulate between the inkjet head 5 and the ink tank 4 through the circulation flow channel 23 by driving the pressure pump 24 and the suction pump 25.

The scanning mechanism 7 makes the inkjet heads 5 perform reciprocal scan in the Y direction. The scanning mechanism 7 is provided with a guide rail 28 extending in the Y direction, and a carriage 29 movably supported by the guide rail 28.

As shown in FIG. 1, the inkjet heads 5 are mounted on the carriage 29. In the illustrated example, the plurality of inkjet heads 5 is mounted on the single carriage 29 so as to be arranged side by side in the Y direction. The inkjet heads 5 are each provided with a head chip 50 (see FIG. 3), an ink supply section (not shown) for coupling the ink circulation mechanism 6 and the head chip 50, and a control section (not shown) for applying a drive voltage to the head chip 50.

First Embodiment

<Head Chip>

The head chip 50 according to a first embodiment will be described.

Figure 3:
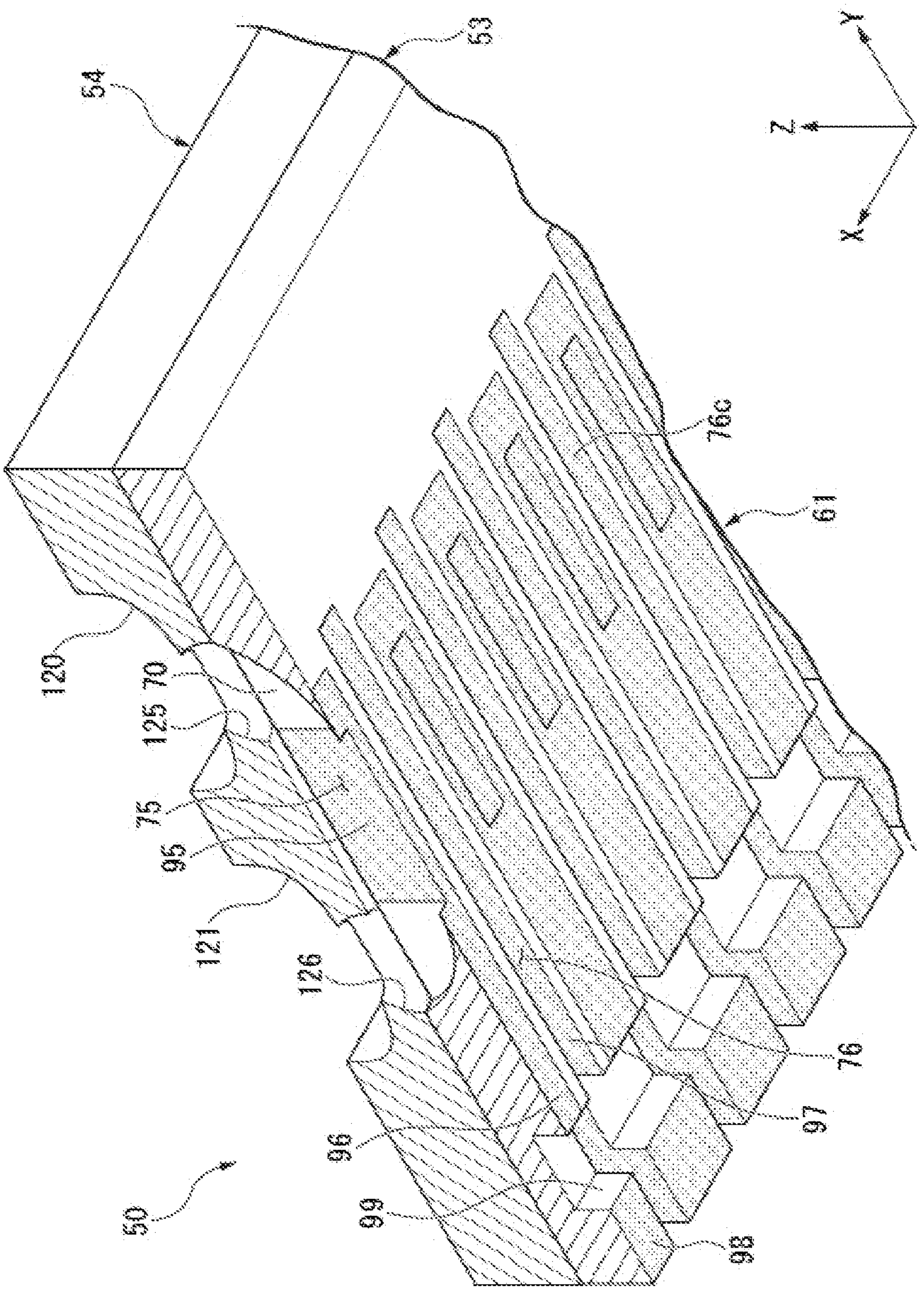
FIG. 3 is a perspective view of a head chip according to a first embodiment.
Figure 4:
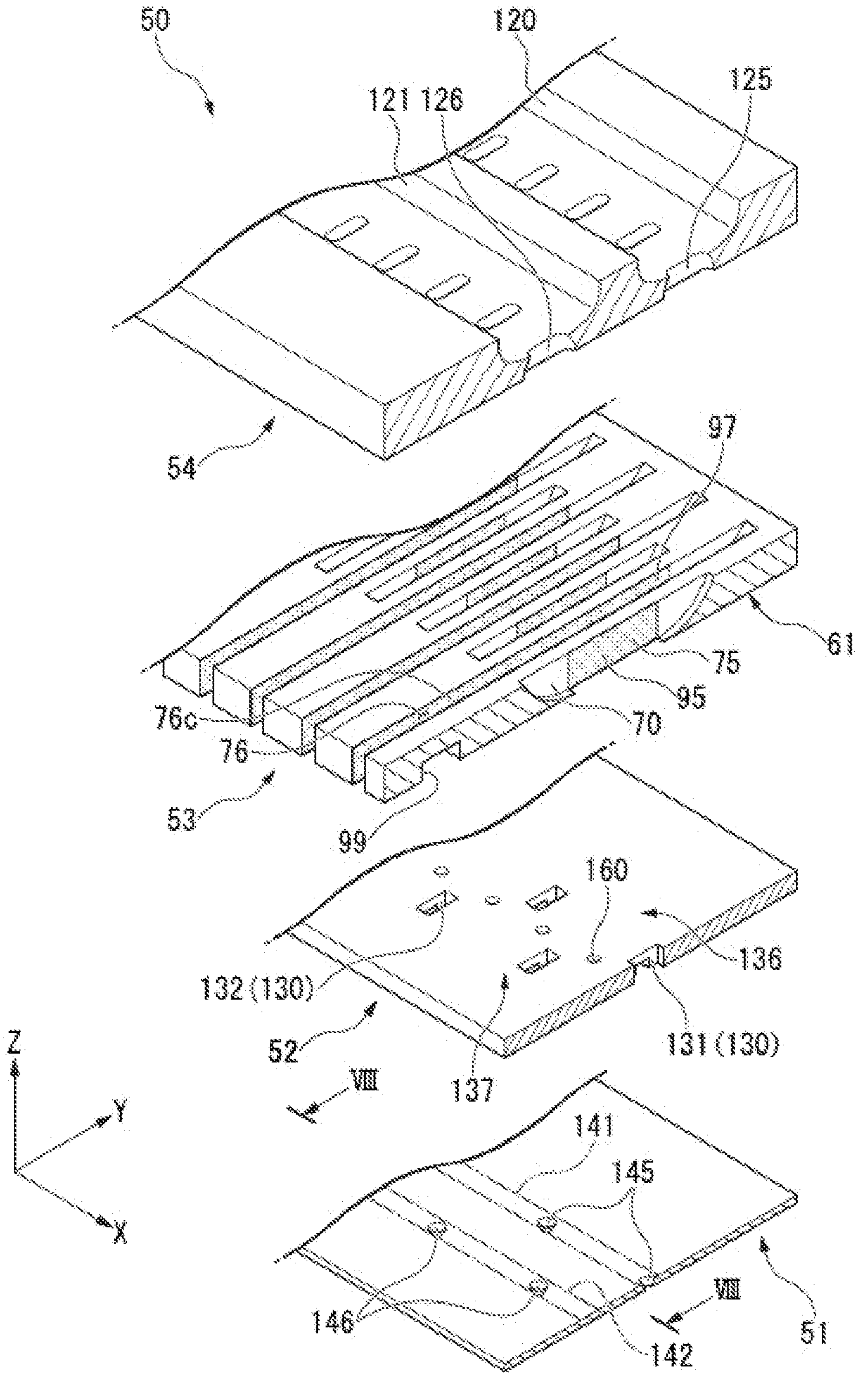
FIG. 4 is an exploded perspective view of the head chip according to the first embodiment.

FIG. 3 is a perspective view of the head chip according to the first embodiment viewed from a −Z side in a state in which a nozzle plate and an intermediate plate are detached. FIG. 4 is an exploded perspective view of the head chip according to the first embodiment.

The head chip 50 shown in FIG. 3 and FIG. 4 is a so-called circulating side-shoot type head chip which circulates the ink with the ink tank 4, and at the same time, ejects the ink from a central portion in the extending direction (the Y direction) in an ejection channel 75 described later. The head chip 50 is provided with the nozzle plate (a jet orifice plate) 51 (see FIG. 4), the intermediate plate 52 (see FIG. 4), an actuator plate 53, and a cover plate 54. The head chip 50 is provided with a configuration in which the nozzle plate 51, the intermediate plate 52, the actuator plate 53, and the cover plate 54 are stacked on one another in this order in the Z direction. In the following explanation, the description is presented in some cases defining a direction (+Z side) from the nozzle plate 51 toward the cover plate 54 along the Z direction as a reverse side, and a direction (−Z side) from the cover plate 54 toward the nozzle plate 51 along the Z direction as an obverse side.

The actuator plate 53 is formed of a piezoelectric material such as PZT (lead zirconate titanate). The actuator plate 53 is a so-called chevron substrate formed by, for example, stacking two piezoelectric plates different in polarization direction in the Z direction on one another. It should be noted that the actuator plate 53 can be a so-called monopole substrate in which the polarization direction is unidirectional throughout the entire area in the Z direction. The actuator plate 53 is provided with a channel column 61. The channel column 61 extends in the X direction.

Figure 5:
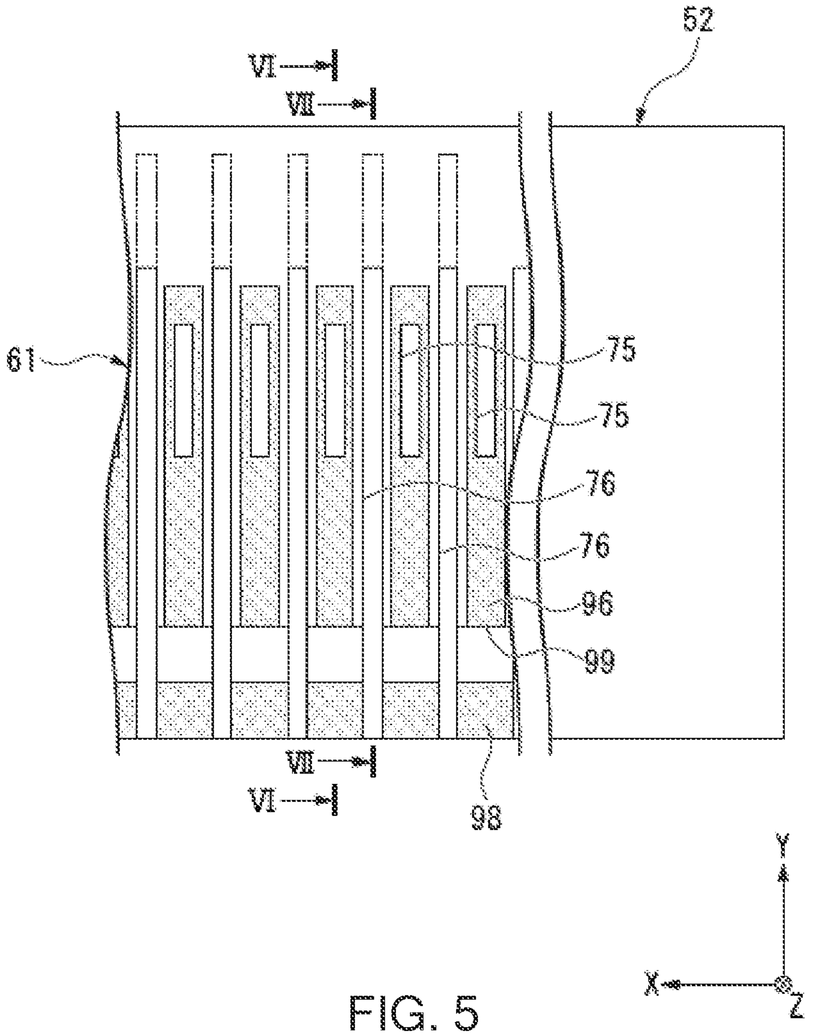
FIG. 5 is a bottom view of an actuator plate in the first embodiment.

FIG. 5 is a bottom view of the actuator plate in the first embodiment.

As shown in FIG. 5, the channel column 61 has the ejection channels (jet channels) 75 filled with the ink, and non-ejection channels (non-jet channels) 76 not filled with the ink. Each of the channels 75, 76 linearly extends in the Y direction in a plan view viewed from the Z direction. The channels 75, 76 are alternately arranged at intervals in the X direction so as to overlap each other in the Y direction. In the actuator plate 53, a portion located between the ejection channel 75 and the non-ejection channel 76 constitutes a drive wall 70 (see FIG. 4) which partitions the ejection channel 75 and the non-ejection channel 76 from each other in the X direction. It should be noted that the configuration in which the channel extension direction coincides with the Y direction will be described in the present embodiment, but the channel extension direction can cross the Y direction.

Figure 6:
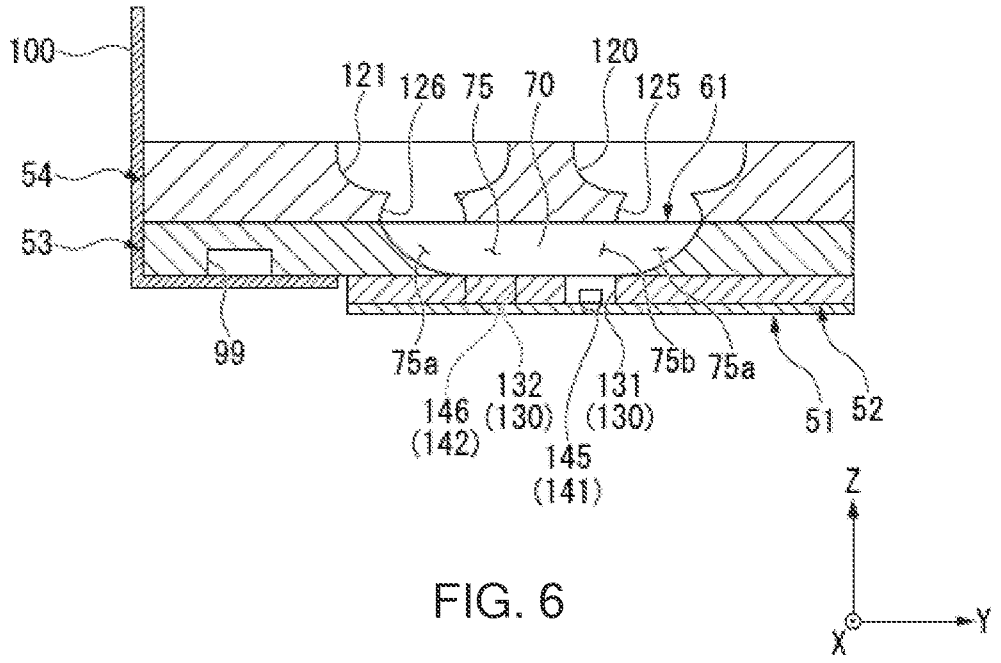
FIG. 6 is a cross-sectional view of the head chip corresponding to a line VI-VI shown in FIG. 5.

FIG. 6 is a cross-sectional view of the head chip corresponding to a line VI-VI shown in FIG. 5.

As shown in FIG. 6, the ejection channel 75 is formed to have a curved shape convex toward the obverse surface in a side view viewed from the X direction. The ejection channels 75 are formed by, for example, making a dicer having a disk-like shape enter the actuator plate 53 from the reverse surface (the +Z side) thereof. Specifically, the ejection channel 75 has uprise parts **75*a* located at both end portions in the Y direction, and an ejection-side penetrating part 75*b* located between the uprise parts 75*a***.

The uprise part **75*a* has a circular arc shape which extends along, for example, a curvature radius of the dicer and has a uniform curvature radius when viewed from the X direction. The uprise part 75*a* extends while curving toward the reverse side as getting away from the ejection-side penetrating part 75*b*** in the Y direction.

The ejection-side penetrating part **75*b* penetrates the actuator plate 53** in the Z direction.

Figure 7:
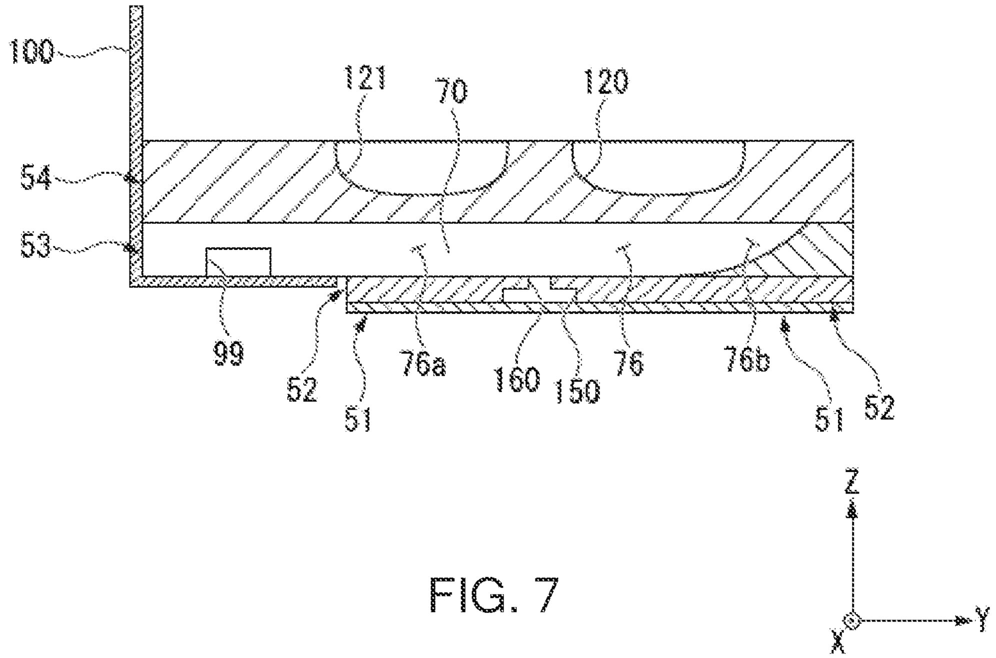
FIG. 7 is a cross-sectional view of the head chip corresponding to a line VII-VII shown in FIG. 5.

FIG. 7 is a cross-sectional view of the head chip corresponding to a line VII-VII shown in FIG. 5.

As shown in FIG. 7, the non-ejection channel 76 is adjacent to the ejection channel 75 across the drive wall 70 in the X direction. The non-ejection channels 76 are formed by, for example, making a dicer having a disk-like shape enter the actuator plate 53 from the reverse surface (the +Z side) thereof. The non-ejection channel 76 is provided with a non-ejection-side penetrating part **76*a* and an uprise part 76*b***.

The non-ejection-side penetrating part **76*a* penetrates the actuator plate 53 in the Z direction. In other words, the non-ejection-side penetrating part 76*a* is formed to have a uniform groove depth in the Z direction. The non-ejection-side penetrating part 76*a* constitutes a portion other than the +Y-side end portion in the non-ejection channel 76**.

The uprise part **76*b* constitutes the +Y-side end portion in the non-ejection channel 76. The uprise part 76*b* has a circular arc shape which extends along, for example, the curvature radius of the dicer and has a uniform curvature radius when viewed from the X direction. The uprise part 76*b* extends while curving toward the reverse side as getting away from the non-ejection-side penetrating part 76*a* in the Y direction. The non-ejection-side penetrating part 76*a* of the non-ejection channel 76 penetrates the actuator plate 53 in the Y direction and the Z direction, and opens on a side surface facing to the −Y side of the actuator plate 53. Thus, the non-ejection channels 76 are communicated with the outside of the head chip 50**.

Figure 8:
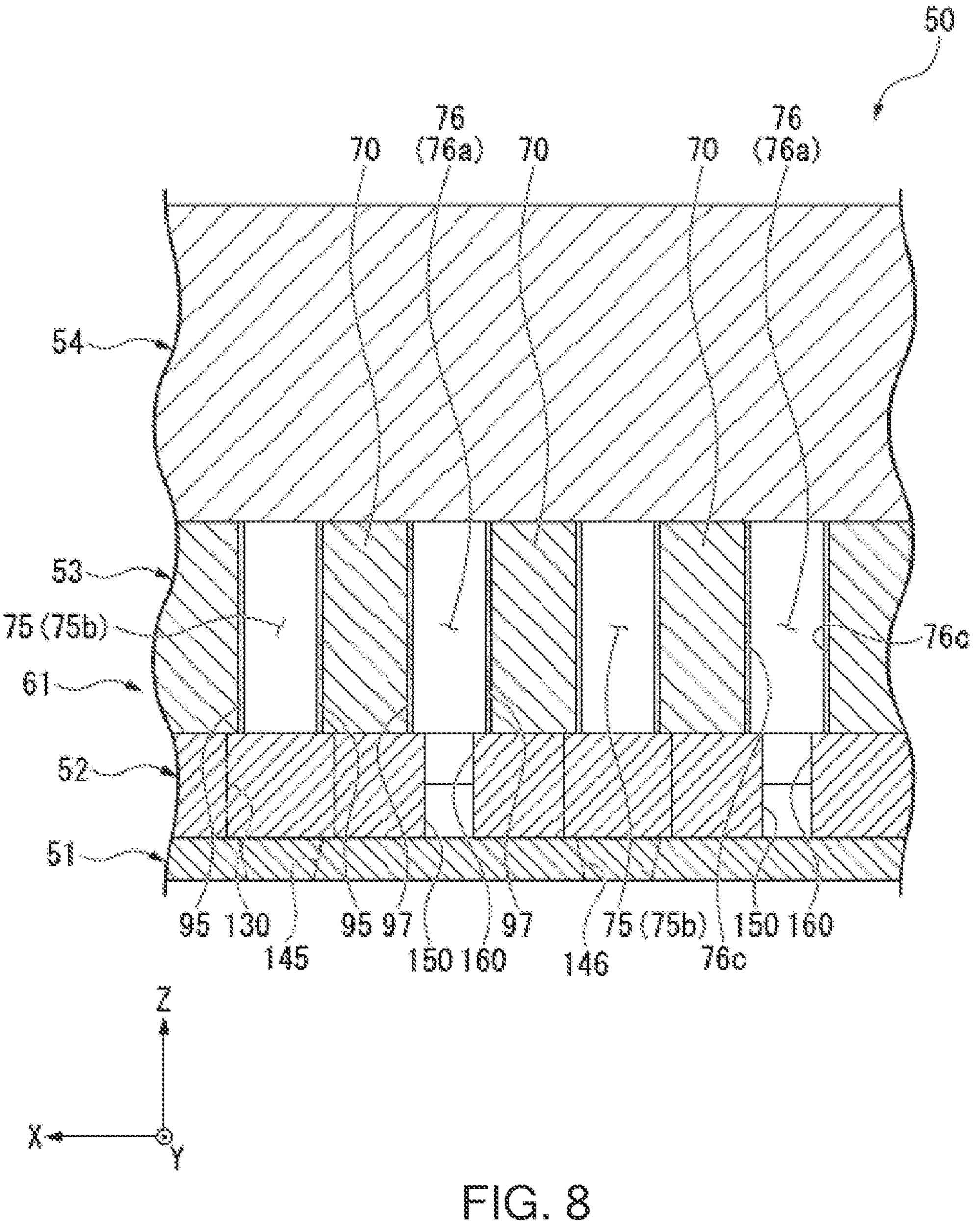
FIG. 8 is a cross-sectional view along a line VIII-VIII shown in FIG. 4.

FIG. 8 is a cross-sectional view along a line VIII-VIII shown in FIG. 4.

As shown in FIG. 8, common electrodes 95 are each formed on an inner surface (an inner side surface facing the ejection channel 75 in the drive wall 70) extending in the Y direction of the ejection channel 75. The common electrodes 95 are each formed throughout the entire area in the Z direction on the inner side surface of the ejection channel 75. The common electrodes 95 are made equivalent in length in the Y direction to the ejection-side penetrating part **75*b* of the ejection channel 75 (equivalent in opening length of the ejection channel 75 on the obverse surface of the actuator plate 53**).

Individual electrodes 97 are each formed on an inner surface **76*c* (an inner side surface facing the non-ejection channel 76 in the drive wall 70) extending in the Y direction of the non-ejection channel 76. The individual electrodes 97** are each formed throughout the entire area in the Z direction on the inner side surface of the non-ejection channel 76.

As shown in FIG. 5, on the obverse surface of the actuator plate 53, there is formed a plurality of common terminals 96. The common terminals 96 are made to have strip-like shapes extending along the Y direction in parallel to each other. The common terminals 96 are each coupled to the pair of common electrodes 95 at an opening edge of the ejection channel 75 corresponding to the common terminal 96.

In a portion located at the −Y direction side of the common terminal 96 on the obverse surface of the actuator plate 53, there is formed an individual terminal 98. The individual terminal 98 is made to have a strip-like shape extending in the X direction. The individual terminal 98 couples the individual electrodes 97 opposed to each other in the X direction across the ejection channel 75 at the opening edges of the non-ejection channels 76 which are opposed to each other in the X direction across the ejection channel 75. It should be noted that in a portion located between the common terminal 96 and the individual terminal 98, there is formed a compartment groove 99. The compartment groove 99 extends in the X direction. The compartment groove 99 separates the common terminal 96 and the individual terminal 98 from each other.

As shown in FIG. 6, a flexible printed board 100 is pressure-bonded to the obverse surface of the actuator plate 53. The flexible printed board 100 is coupled to the common terminals 96 and the individual terminals 98 corresponding to the channel column 61. The flexible printed board 100 is extracted toward the +Z side passing the −Y side of the actuator plate 53.

As shown in FIG. 3 and FIG. 4, the cover plate 54 is bonded to the reverse surface of the actuator plate 53 so as to close the channel column 61. In the cover plate 54, at a position corresponding to the channel column 61, there are formed an entrance common ink chamber 120 and an exit common ink chamber 121.

The entrance common ink chamber 120 is formed at a position overlapping the +Y side end portion of the ejection channel 75 in the plan view in the channel column 61. The entrance common ink chamber 120 extends in the X direction with a length sufficient for straddling the channel column 61, and at the same time, opens on the reverse surface of the cover plate 54.

The exit common ink chamber 121 is formed at a position overlapping the −Y side end portion of the ejection channel 75 in the plan view in the channel column 61. The exit common ink chamber 121 extends in the X direction with a length sufficient for straddling the channel column 61, and at the same time, opens on the reverse surface of the cover plate 54.

In the entrance common ink chamber 120, at the positions corresponding to the ejection channels 75 in the channel column 61, there are formed entrance slits 125, respectively. The entrance slits 125 each communicate the +Y side end portion of corresponding one of the ejection channels 75 and the entrance common ink chamber 120 with each other.

In the exit common ink chamber 121, at the positions corresponding to the ejection channels 75 in the channel column 61, there are formed exit slits 126, respectively. The exit slits 126 each communicate the −Y side end portion of corresponding one of the ejection channels 75 and the exit common ink chamber 121 with each other. Therefore, the entrance slits 125 and the exit slits 126 are communicated with the respective ejection channels 75 on the one hand, but are not communicated with the non-ejection channels 76 on the other hand.

The intermediate plate 52 is bonded to the obverse surface of the actuator plate 53 so as to close the channel column 61. The intermediate plate 52 is formed of a piezoelectric material such as PZT similarly to the actuator plate 53. For example, the intermediate plate 52 is thinner in thickness in the Z direction than the actuator plate 53. The intermediate plate 52 is made shorter in dimension in the Y direction than the actuator plate 53. Therefore, at the −Y direction side of the intermediate plate 52, there is exposed an end portion in the −Y direction in the actuator plate 53. In the end portion at the −Y direction side in the actuator plate 53, portions exposed from the intermediate plate 52 function as pressure-bonding portions for the flexible printed board 100. It should be noted that the intermediate plate 52 can be formed of a material (e.g., a nonconductive material such as polyimide or alumina) other than the piezoelectric material.

Figure 9:
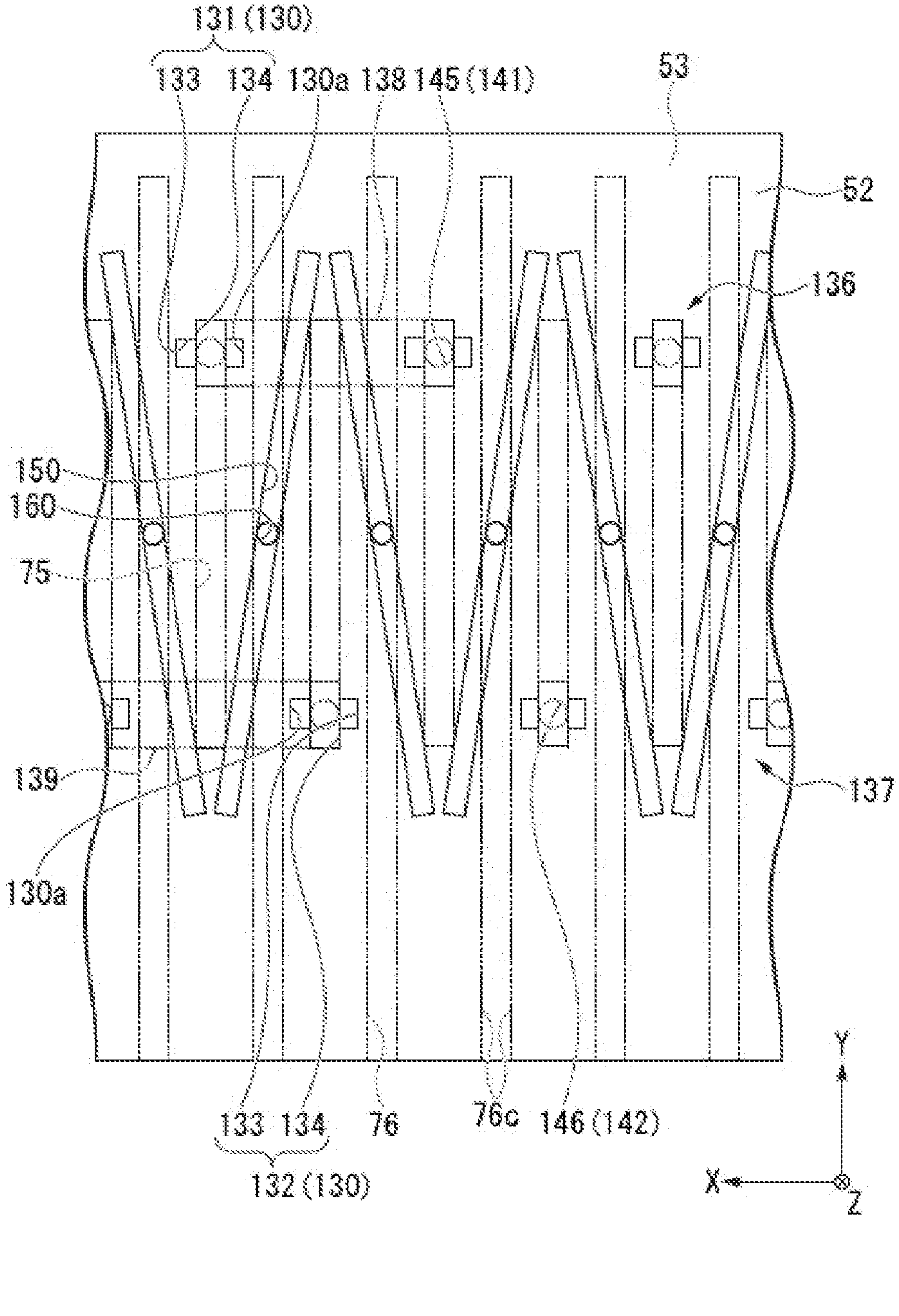
FIG. 9 is a bottom view of an intermediate plate and the actuator plate in the first embodiment.

FIG. 9 is a bottom view of the intermediate plate and the actuator plate in the first embodiment.

As shown in FIG. 9, the intermediate plate 52 is provided with communication holes 130, non-penetrating grooves 150, and penetrating holes 160 formed so as to correspond to the channel column 61.

The communication holes 130 overlap the ejection-side penetrating parts **75*b* of the ejection channels 75 in the plan view, respectively. The communication holes 130 are communicated with the ejection-side penetrating parts 75*b* of the corresponding ejection channels 75, respectively, at the obverse surface side of the actuator plate 53**.

The communication holes 130 are each provided with a groove part 133 and a penetrating part 134. The groove part 133 is recessed from the obverse surface of the intermediate plate 52, and extends in the Y direction. The penetrating part 134 penetrates the intermediate plate 52 to be communicated with the groove part 133. In the present embodiment, a dimension in the X direction in the penetrating part 134 is made smaller than a dimension in the X direction in the groove part 133. The penetrating part 134 overlaps the center in the X direction of the groove part 133 in the plan view, and protrudes toward both sides in the Y direction from the groove part 133.

The communication holes 130 have two columns of communication hole groups 136, 137 each arranged in a line in the X direction. In the two columns of communication hole groups 136, 137, a communication hole group located at the +Y direction side is defined as a first communication hole group 136, and the communication holes 130 included in the first communication hole group 136 are referred to as first communication holes 131. In the two columns of communication hole groups 136, 137, a communication hole group located at the −Y direction side is defined as a second communication hole group 137, and the communication holes 130 included in the second communication hole group 137 are referred to as second communication holes 132. A pair of communication holes 130 adjacent to each other in the X direction out of the communication holes 130 included in the two columns of communication hole groups 136, 137 are arranged so as to be shifted in the Y direction from each other. Thus, the communication holes 130 included in the two columns of communication hole groups 136, 137 are arranged in a zigzag manner. It should be noted that the pair of communication holes 130 adjacent to each other in the X direction are communication holes 130 close to each other in the X direction irrespective of a positional relationship in the Y direction. In other words, in the configuration of the present embodiment in which the communication holes 130 are arranged in a zigzag manner, the pair of communication holes 130 adjacent to each other in the X direction are the first communication hole 131 and the second communication hole 132, and are adjacent to each other in the Y direction.

Here, inter-communication hole regions 138, 139 are defined on the obverse surface of the intermediate plate 52. The inter-communication hole regions 138, 139 are each a region between opening edges 130*a* of the pair of communication holes 130 adjacent to each other in corresponding one of the communication hole groups 136, 137. In other words, the inter-communication hole region 138, 139 correspond to a first inter-communication hole region 138 between the opening edges 130*a* of the pair of first communication holes 131 adjacent to each other, and a second inter-communication hole region 139 between the opening edges 130*a* of the pair of second communication holes 132 adjacent to each other.

The non-penetrating grooves 150 open only on the obverse surface of the intermediate plate 52. A part of each of the non-penetrating grooves 150 is located between the pair of communication holes 130 adjacent to each other in the X direction. The non-penetrating grooves 150 each overlap the non-ejection channel 76 in the plan view. A part of the non-penetrating groove 150 is located in one of the inter-communication hole regions 138, 139. The non-penetrating groove 150 extends to the first inter-communication hole region 138 and the second inter-communication hole region 139 from the portion between the pair of communication holes 130 adjacent to each other in the X direction. The non-penetrating grooves 150 each extend from an area between the pair of communication holes 130 adjacent to each other in the X direction to each of the first inter-communication hole region 138 and the second inter-communication hole region 139. The non-penetrating grooves 150 each extend continuously from the first inter-communication hole region 138 to the second inter-communication hole region 139. The non-penetrating grooves 150 each extend throughout the whole length in the Y direction of each of the inter-communication hole regions 138, 139. The non-penetrating grooves 150 protrude toward the +Y direction from the first inter-communication hole region 138, and at the same time, protrude toward the −Y direction from the second inter-communication hole region 139. The non-penetrating grooves 150 each extend linearly with a constant width throughout the whole length. The non-penetrating grooves 150 extend so as to be tilted with respect to the Y direction in the plan view.

Figure 10:
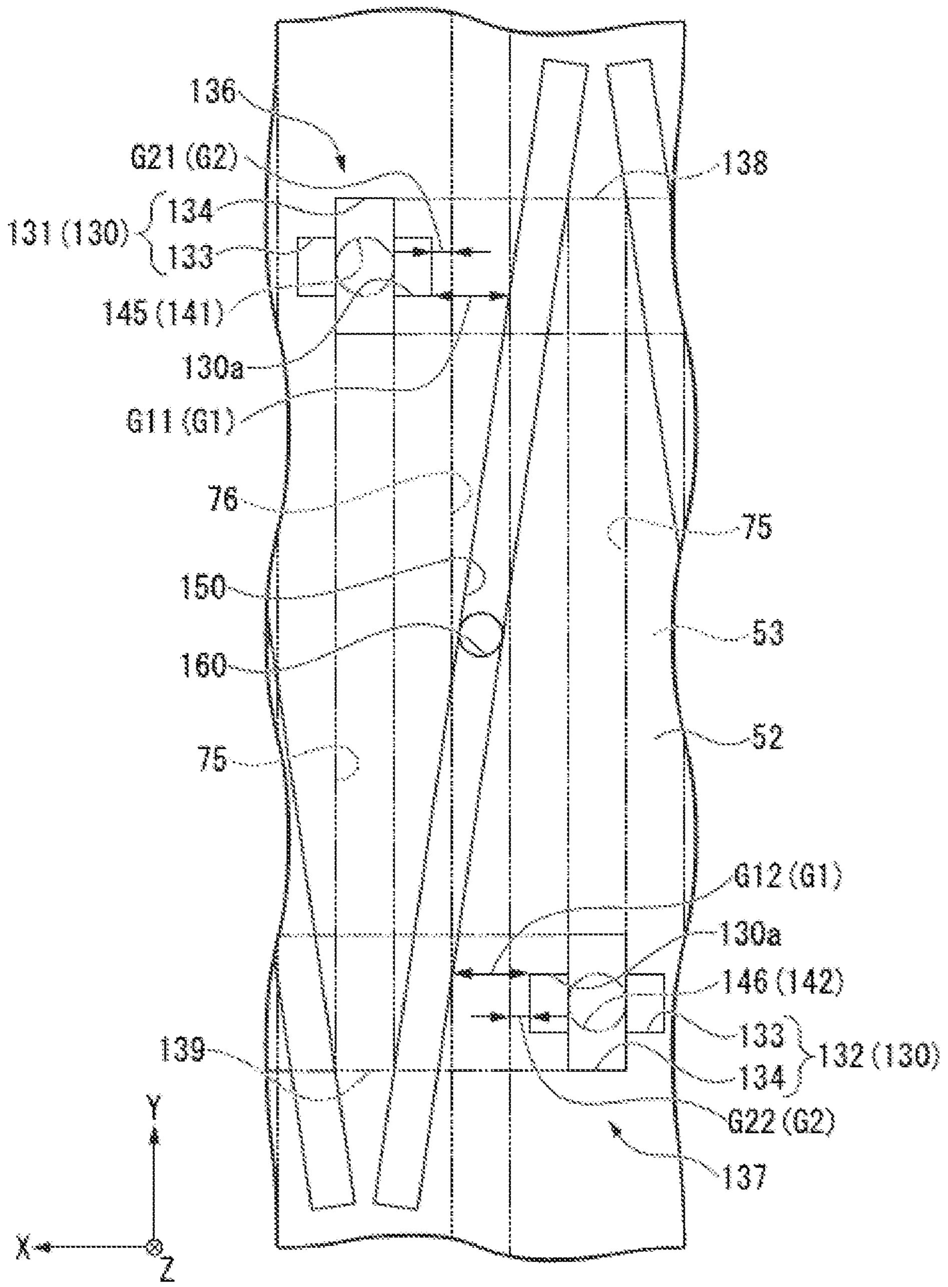
FIG. 10 is a diagram showing a part of FIG. 9 in an enlarged manner.

FIG. 10 is a diagram showing a part of FIG. 9 in an enlarged manner.

As shown in FIG. 10, each of the non-penetrating grooves 150 is formed so as to fulfill the following conditions with respect to the communication holes 130 located on the periphery thereof. When focusing attention on arbitrary one of the non-penetrating grooves 150, in each of the inter-communication hole regions 138, 139, a minimum gap G1 in the X direction between the non-penetrating groove 150 and the opening edge 130*a* of the communication hole 130 is larger than a minimum gap G2 in the X direction between the opening edge 130*a* of that communication hole 130 and the non-ejection channel 76. Specifically, in the first inter-communication hole region 138, a minimum gap G11 in the X direction between the non-penetrating groove 150 and the opening edge 130*a* of the first communication hole 131 is larger than a minimum gap G21 in the X direction between the opening edge 130*a* of the first communication hole 131 and the non-ejection channel 76. Further, in the second inter-communication hole region 139, a minimum gap G12 in the X direction between the non-penetrating groove 150 and the opening edge 130*a* of the second communication hole 132 is larger than a minimum gap G22 in the X direction between the opening edge 130*a* of the second communication hole 132 and the non-ejection channel 76. It should be noted that the minimum gap in the X direction in the present embodiment is a gap between two structures as a target at a position in the Y direction where the distance in the X direction between the two structures is the shortest.

As shown in FIG. 9, the penetrating holes 160 penetrate the intermediate plate 52 in the Z direction. The penetrating holes 160 do not overlap the inter-communication hole regions 138, 139 in the plan view. The penetrating holes 160 open in the non-penetrating grooves 150, and are communicated with the non-penetrating grooves 150, respectively. The penetrating holes 160 overlap the non-ejection-side penetrating parts 76*a* of the non-ejection channels 76, respectively, in the plan view. The penetrating holes 160 are communicated with the non-ejection-side penetrating parts 76*a* of the corresponding non-ejection channels 76, respectively, at the obverse surface side of the actuator plate 53. Thus, the penetrating holes 160 are communicated with the outside of the head chip 50 through the non-ejection channels 76, respectively. It should be noted that the penetrating holes 160 are each formed to have a circular shape in the plan view in the illustrated example, but the shape of each of the penetrating holes 160 is not particularly limited, and the penetrating holes 160 can each be formed to have, for example, a rectangular shape or an oval shape in the plan view.

As shown in FIG. 4, the nozzle plate 51 is bonded to the obverse surface of the intermediate plate 52. The nozzle plate 51 is made equivalent in width in the Y direction to the intermediate plate 52. In the present embodiment, the nozzle plate 51 is formed of a metal material (stainless steel, Ni—Pd, or the like) such as stainless steel. It should be noted that it is possible for the nozzle plate 51 to have a single layer structure or a laminate structure with a resin material such as polyimide, glass, silicone, or the like besides the metal material.

In the nozzle plate 51, two nozzle arrays (a nozzle A array 141 and a nozzle B array 142) extending in the X direction are formed at a distance in the Y direction. The nozzle A array 141 corresponds to the first communication hole group 136. The nozzle B array 142 corresponds to the second communication hole group 137. The nozzle arrays 141, 142 each include a plurality of nozzle holes 145, 146 (jet orifices) penetrating the nozzle plate 51 in the Z direction. The plurality of nozzle holes 145, 146 corresponds to nozzle A holes 145 included in the nozzle A array 141, and nozzle B holes 146 included in the nozzle B array 142. The nozzle holes 145 and the nozzle holes 146 are each arranged at intervals in the X direction. Each of the nozzle holes 145, 146 is formed to have, for example, a taper shape having the inner diameter gradually decreasing in a direction from the reverse side toward the obverse side.

As shown in FIG. 6 and FIG. 7, the nozzle A holes 145 are individually communicated with the ejection channels 75 through the first communication holes 131, respectively. The nozzle B holes 146 are individually communicated with the ejection channels 75 through the second communication holes 132, respectively. Since the communication holes 130 are arranged in a zigzag manner, the nozzle holes 145, 146 are also arranged in a zigzag manner. The nozzle plate 51 does not have a hole communicated with the non-penetrating grooves 150 in the intermediate plate 52, and closes the whole of the non-penetrating grooves 150 from the obverse side.

<Method of Manufacturing Head Chip>

A method of manufacturing the head chip 50 according to the present embodiment will be described. The method of manufacturing the head chip according to the present embodiment is provided with a first bonding step (an intermediate plate bonding step), a first inspection step, a non-penetrating groove formation step, a penetrating hole formation step, a second bonding step, and a second inspection step.

Figure 11:
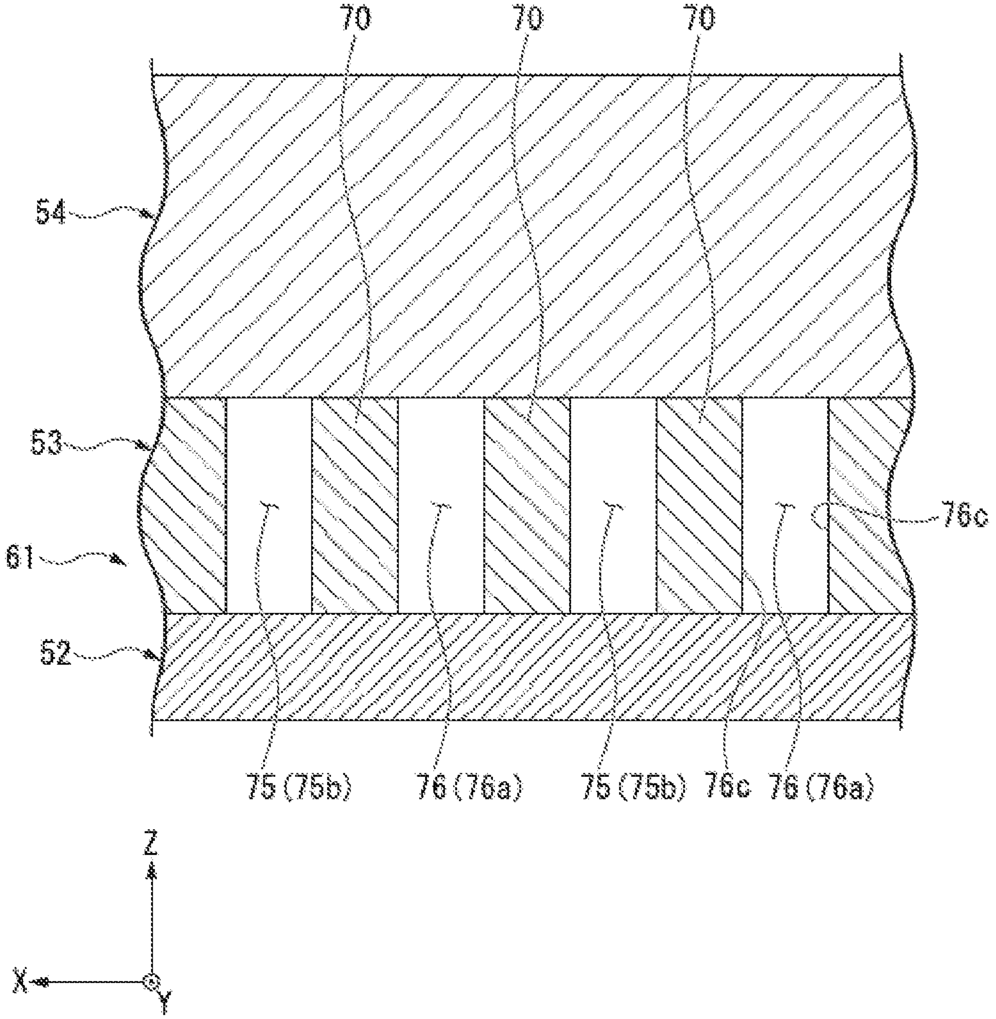
FIG. 11 is a diagram for explaining a method of manufacturing the head chip according to the first embodiment.
Figure 12:
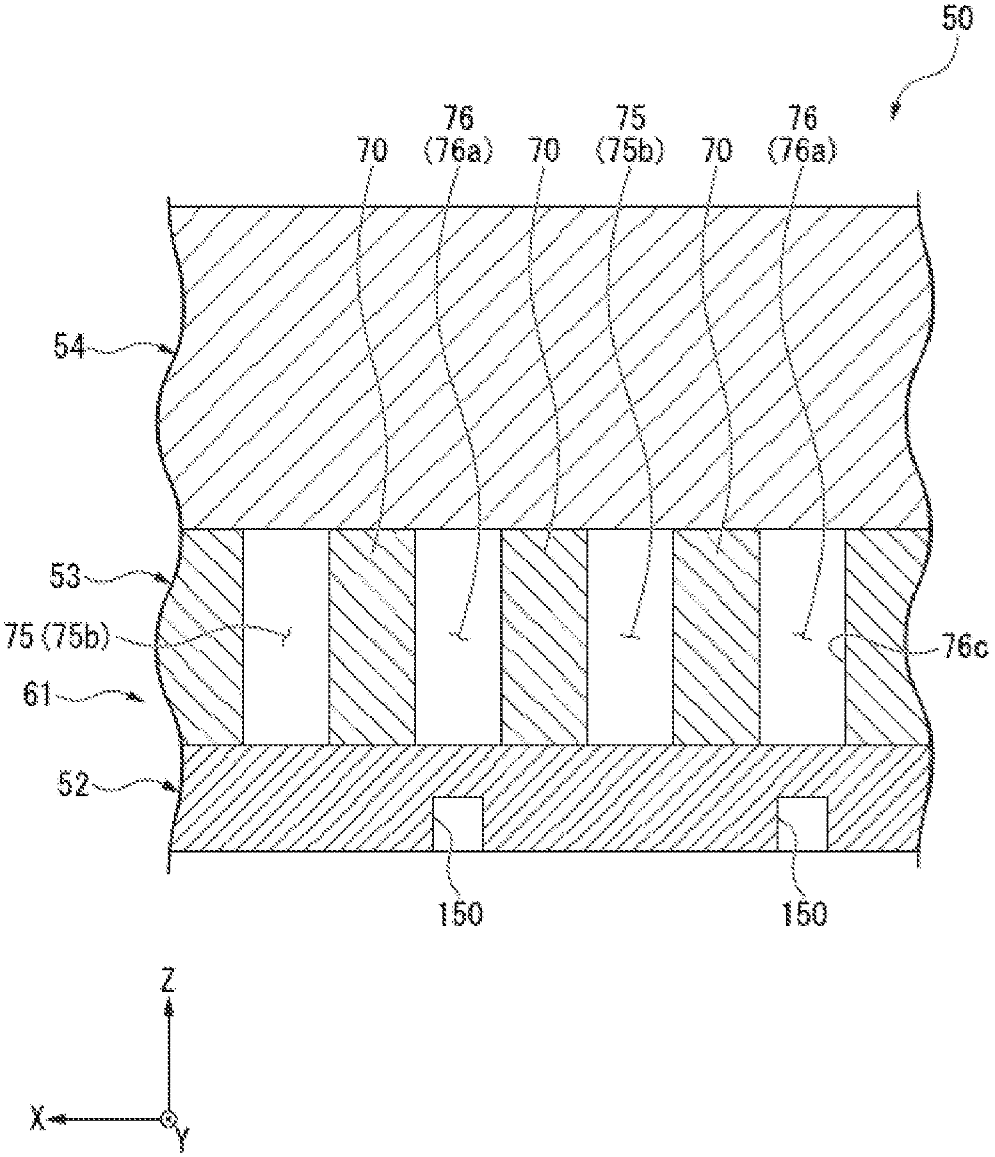
FIG. 12 is a diagram for explaining the method of manufacturing the head chip according to the first embodiment.
Figure 13:
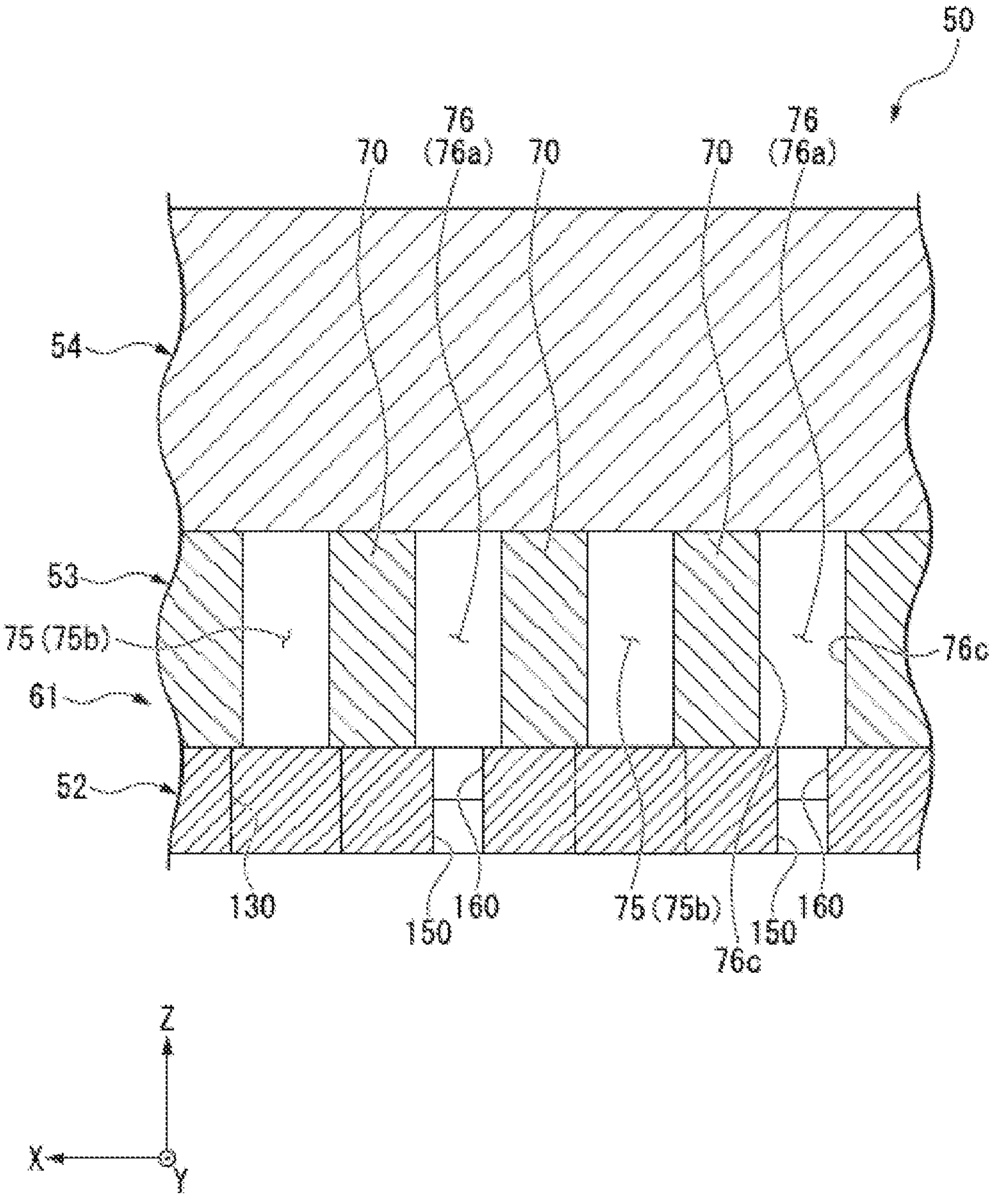
FIG. 13 is a diagram for explaining the method of manufacturing the head chip according to the first embodiment.

FIG. 11 through FIG. 13 are diagrams for explaining the method of manufacturing the head ship according to the first embodiment, and are each a cross-sectional view corresponding to FIG. 8.

As shown in FIG. 11, in the first bonding step, the intermediate plate 52 is stacked in the Z direction on the actuator plate 53 to bond the intermediate plate 52 to the actuator plate 53. For example, the actuator plate 53 and the intermediate plate 52 are bonded to each other with an adhesive. The intermediate plate 52 to be bonded to the actuator plate 53 in the first bonding step is not provided with both of the communication holes 130 and the penetrating holes 160. It should be noted that in each of the drawings of FIG. 11 through FIG. 13, illustration of the common electrodes 95 formed on the inner surfaces of the ejection channels 75 and the individual electrodes 97 formed on the inner surfaces 76*c* of the non-ejection channels 76 is omitted.

Subsequently, in the first inspection step, a bonding defect in the bonding portion between the actuator plate 53 and the intermediate plate 52 is detected. The bonding defect as the detection object is a leak path which communicates the ejection channel 75 and the non-ejection channel 76 with each other. In the first inspection step, vacuuming is performed on each of the ejection channels 75, and the presence or absence of the leakage on that occasion is judged. When there exists the leak path which communicates the ejection channel 75 and the non-ejection channel 76 with each other, a gas inflows into the ejection channel 75 from the non-ejection channel 76 opening in the side surface of the actuator plate 53 through the leak path, and therefore, it is possible to detect the bonding defect.

Subsequently, as shown in FIG. 12, in the non-penetrating groove formation step, the non-penetrating grooves 150 are formed in the intermediate plate 52. For example, in the non-penetrating groove formation step, the non-penetrating grooves 150 are formed in the intermediate plate 52 using a laser. On this occasion, it is desirable to continuously scan the intermediate plate 52 with a laser beam to form the whole of each of the non-penetrating grooves 150 in a lump but not partially.

Subsequently, as shown in FIG. 13, in the penetrating hole formation step, the communication holes 130 and the penetrating holes 160 are formed in the intermediate plate 52. For example, in the penetrating hole formation step, the communication holes 130 and the penetrating holes 160 are formed in the intermediate plate 52 using a laser. It should be noted that the order of forming the communication holes 130 and the penetrating holes 160 is not particularly limited. Further, the penetrating hole formation step can be performed before the non-penetrating groove formation step. Further, the penetrating hole formation step can be performed at the same time as the non-penetrating groove formation step. In this case, it is possible to form the non-penetrating grooves 150 and the penetrating holes 160 with a series of scanning with the laser beam. It should be noted that it is desirable to perform the penetrating hole formation step after the first bonding step, and it is possible to increase the positional accuracy between the ejection channels 75 and the communication holes 130, and the positional accuracy between the non-ejection channels 76 and the penetrating holes 160.

Subsequently, in the second bonding step, the nozzle plate 51 provided with the nozzle holes 145, 146 is stacked on the opposite side of the intermediate plate 52 to the actuator plate 53 to bond the nozzle plate 51 to the intermediate plate 52. For example, the intermediate plate 52 and the nozzle plate 51 are bonded to each other with an adhesive. By bonding the nozzle plate 51 to the intermediate plate 52, the nozzle holes 145, 146 are respectively communicated with the communication holes 130, and at the same time, the whole of each of the non-penetrating grooves 150 is closed by the nozzle plate 51.

Subsequently, in the second inspection step, the bonding defect in the bonding portion between the intermediate plate 52 and the nozzle plate 51 is detected. The bonding defect as the detection object is the leak path which communicates the communication hole 130 and the non-penetrating groove 150 with each other. In the second inspection step, vacuuming is performed on each of the ejection channels 75 in the state of blocking the nozzle holes 145, 146, and the presence or absence of the leakage on that occasion is judged. The blockage of the nozzle holes 145, 146 is achieved by overlapping a jig or the like not shown on the opposite side of the nozzle plate 51 to the intermediate plate 52. When there exists the leak path which communicates the communication hole 130 and the non-penetrating groove 150 with each other, a gas inflows into the ejection channel 75 from the non-ejection channel 76 opening in the side surface of the actuator plate 53 through the penetrating hole 160, the non-penetrating groove 150, the leak path, and the communication hole 130, and therefore, it is possible to detect the bonding defect.

Then, by performing the pressure-bonding of the flexible printed board 100 targeting those having passed the second inspection step, the head chip 50 is completed.

It should be noted that although in the present embodiment, the intermediate plate 52 not provided with the communication holes 130 is used in the first bonding step, this is not a limitation. Specifically, it is possible to use the intermediate plate 52 provided with the communication holes 130 in the first bonding step. In this case, by blocking the communication holes 130 using a jig in the first inspection step similarly to the second inspection step, it is possible to detect the leak path communicating the ejection channel 75 and the non-ejection channel 76 with each other.

As described hereinabove, the head chip 50 according to the present embodiment is provided with the intermediate plate 52 and the nozzle plate 51, wherein the intermediate plate 52 is provided with the communication holes 130 respectively communicated with the ejection channels 75 and the non-penetrating grooves 150 respectively communicated with the non-ejection channels 76 through the penetrating holes 160, the nozzle plate 51 is overlapped with the intermediate plate 52 in the state in which the non-penetrating grooves 150 are closed, and the nozzle plate 51 is provided with the nozzle holes 145, 146 which are respectively communicated with the communication holes 130, and from which the ink contained in the ejection channels 75 is jetted.

According to this configuration, the bonding defect portion between the intermediate plate 52 and the nozzle plate 51 is coupled to the communication hole 130 and the non-penetrating groove 150 of the intermediate plate 52, and thus, the communication hole 130 and the non-penetrating groove 150 are communicated with each other via the bonding defect portion. Thus, the ejection channel 75 and the nozzle holes 145, 146 in the intermediate plate 52 are communicated with each other. Since the penetrating holes 160 are communicated with the outside of the head chip 50 through the non-ejection channels 76, by detecting the leakage when blocking the nozzle holes 145, 146 and vacuuming the ejection channel 75, it is possible to make the penetrating hole 160 and the non-penetrating groove 150 function as a flow channel for detecting the leakage that couples the bonding defect portion and the non-ejection channel 76 to each other to thereby detect the presence of the bonding defect portion.

In particular, the non-penetrating grooves 150 are located in the inter-communication hole regions 138, 139 on the obverse surface of the intermediate plate 52, and therefore it is possible to efficiently detect the bonding defect portion in the inter-communication hole regions 138, 139. Moreover, since the non-penetrating grooves 150 do not open on the actuator plate 53 side, it is possible to increase the degree of freedom of the shape of the flow channel for detecting the leakage compared to a configuration in which the flow channel for detecting the leakage is formed only of the penetrating hole.

Further, in the present embodiment, in each of the inter-communication hole regions 138, 139, the minimum gap G1 in the X direction between the non-penetrating groove 150 and the opening edge 130*a* of the communication hole 130 is set larger than the minimum gap G2 in the X direction between the opening edge 130*a* of that communication hole 130 and the non-ejection channel 76. Since the communication holes 130 adjacent to each other in the X direction are shifted in the Y direction from each other, when focusing attention on the pair of communication holes 130 adjacent to each other in the X direction (the first communication hole 131 and the second communication hole 132), unlike the configuration in which the pair of communication holes 130 are arranged in a line in the X direction, even when making the minimum gap G1 between the opening edge 130*a* of one (e.g., the first communication hole 131) of the communication holes 130 and the non-penetrating groove 150 longer than the minimum gap G2 between the one of the communication holes 130 and the non-ejection channel 76, it is possible to prevent the non-penetrating groove 150 from becoming close to the other (e.g., the second communication hole 132) of the communication holes 130. Thus, it is possible to increase the width in the X direction in the bonding portion between the intermediate plate 52 and the nozzle plate 51. In other words, it is possible to ensure the bonding margin between the intermediate plate 52 and the nozzle plate 51 in an area between the non-penetrating groove 150 and the communication hole 130. Therefore, it is possible to more surely bond the intermediate plate 52 and the nozzle plate 51 to each other.

Due to the above, it is possible to detect the bonding defect between the intermediate plate 52 and the nozzle plate 51 to prevent the deterioration in printing quality caused by the bonding defect while suppressing the decrease in bonding margin between the intermediate plate 52 and the nozzle plate 51 caused by disposing the non-penetrating grooves 150.

Further, the non-penetrating grooves 150 each extend throughout the whole length in the Y direction of the first inter-communication hole region 138. According to this configuration, the non-penetrating grooves 150 are each disposed on the shortest path connecting the pair of first communication holes 131 to each other across the first inter-communication hole region 138. The same applies to a point that the non-penetrating grooves 150 each extend throughout the whole length in the Y direction of the second inter-communication hole region 139. Thus, it is possible to detect the bonding defect which can induce the unintended communication between the ejection channels 75 in a part to which the fluid pressure is apt to be applied.

Further, the non-penetrating grooves 150 each extend continuously from the first inter-communication hole region 138 to the second inter-communication hole region 139. According to this configuration, the non-penetrating grooves 150 are each disposed on the shortest path connecting the pair of communication holes 130 adjacent to each other in the Y direction (the first communication hole 131 and the second communication hole 132). Thus, it is possible to detect the bonding defect which can induce the unintended communication between the ejection channels 75 in a part to which the fluid pressure is apt to be applied.

Here, when forming the non-penetrating grooves with the laser, when a bending part is supposedly formed in the non-penetrating groove in the plan view, the irradiation density of the laser beam locally increases in the bending part, and there is a possibility that unintended penetration, generation of a debris or the like occurs. In the present embodiment, since the non-penetrating grooves 150 extend linearly throughout the entire length, no bending part is formed in the plan view in the non-penetrating grooves 150, and thus, it is possible to homogenously form the non-penetrating grooves 150 throughout the entire length. Therefore, it is possible to prevent the reliability from deteriorating due to the unintended penetration or the like which occurs when forming the non-penetrating grooves 150.

Further, in the first embodiment, the penetrating hole formation step is performed after the intermediate plate bonding step. Thus, it is possible to form the penetrating holes 160 at the desired positions with respect to the non-ejection channels 76 in the penetrating hole formation step irrespective of the alignment accuracy between the actuator plate 53 and the intermediate plate 52. Therefore, in the head chip 50 provided with the intermediate plate 52 provided with the penetrating holes 160 respectively communicated with the non-ejection channels 76, it is possible to achieve an increase in fabrication yield.

It should be noted that the first bonding step is performed before the non-penetrating groove formation step in the first embodiment, but it is possible to perform the first bonding step after the non-penetrating groove formation step. Thus, it is possible to perform the step of providing the non-penetrating grooves 150 to the intermediate plate 52 in parallel to a step to be performed prior to the first bonding step in the head chip manufacturing. Therefore, it is possible to shorten the manufacturing period of the head chip.

Second Embodiment

Then, a second embodiment will be described with reference to FIG. 14.

Figure 14:
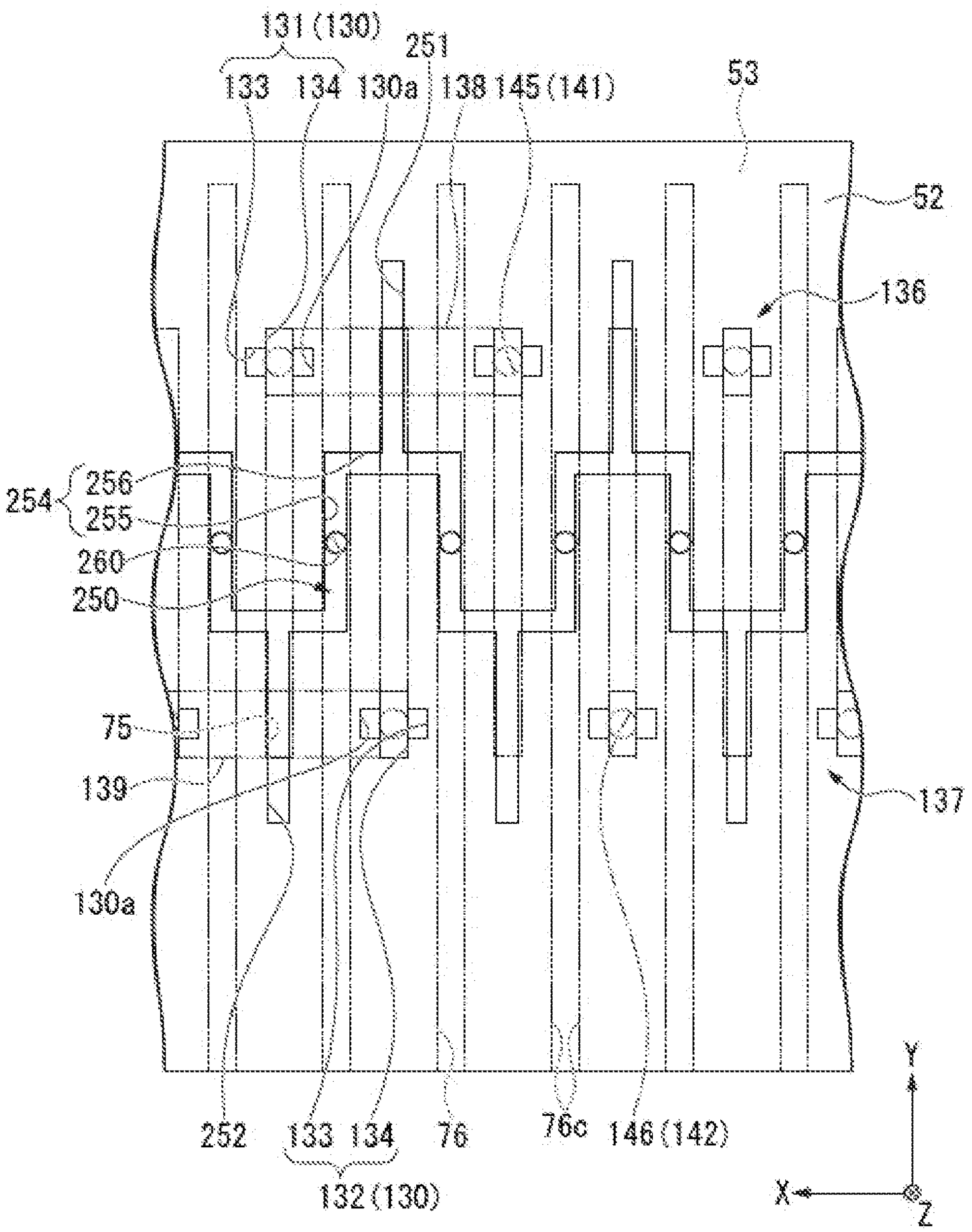
FIG. 14 is a bottom view of an intermediate plate and an actuator plate in a second embodiment.

FIG. 14 is a bottom view of an intermediate plate and an actuator plate in the second embodiment.

As shown in FIG. 14, the intermediate plate 52 in the present embodiment has non-penetrating grooves 250 and penetrating holes 260 instead of the non-penetrating grooves 150 and the penetrating holes 160 in the first embodiment. It should be noted that the configuration except a part described hereinafter is substantially the same as in the first embodiment.

The non-penetrating grooves 250 are each provided with transverse parts 251, 252 extending so as to respectively traverse the inter-communication hole regions 138, 139 in the Y direction, and a coupling part 254 for coupling the transverse parts 251, 252 and the penetrating hole 260 to each other outside the inter-communication hole regions 138, 139.

The transverse parts 251, 252 extend in the Y direction at a central position between the pair of communication holes 130 across corresponding one of the inter-communication hole regions 138, 139. The transverse parts 251, 252 each extend linearly with a constant width. The transverse parts 251, 252 each extend in the Y direction so that the distances to the pair of communication holes 130 located at both sides in the X direction at each position in the Y direction become equal to each other. The transverse parts 251, 252 are formed respectively in the inter-communication hole regions 138, 139 one by one. Specifically, the transverse parts 251, 252 correspond to a first transverse part 251 extending in the Y direction at the central position between the pair of first communication holes 131 across the first inter-communication hole region 138, and a second transverse part 252 extending in the Y direction at the central position of the pair of second communication holes 132 across the second inter-communication hole region 139. The transverse parts 251, 252 extend in the inter-communication hole regions 138, 139 throughout the entire length in the Y direction, respectively, to protrude at both sides in the Y direction.

The coupling part 254 is formed only between the inter-communication hole regions 138, 139 adjacent in the Y direction to each other. The coupling part 254 couples an end portion at the second inter-communication hole region 139 side in the first transverse part 251 and an end portion at the first inter-communication hole region 138 side in the second transverse part 252 to each other. A part of the coupling part 254 overlaps the non-ejection channel 76 in the plan view. In the present embodiment, the coupling part 254 is provided with an intermediate part 255 extending along the Y direction at a position overlapping the non-ejection channel 76 in the plan view, and joining parts 256 for joining an end portion of the intermediate part 255 and end portions of the transverse parts 251, 252. The intermediate part 255 is formed only outside the inter-communication hole regions 138, 139. The intermediate part 255 extends linearly with a constant width. The joining parts 256 are coupled to the intermediate part 255, and the transverse parts 251, 252 adjacent in the X direction to the intermediate part 255 via bending parts, respectively. The joining parts 256 extend along the X direction outside the inter-communication hole regions 138, 139. The joining parts 256 extend linearly with a constant width.

Figure 15:
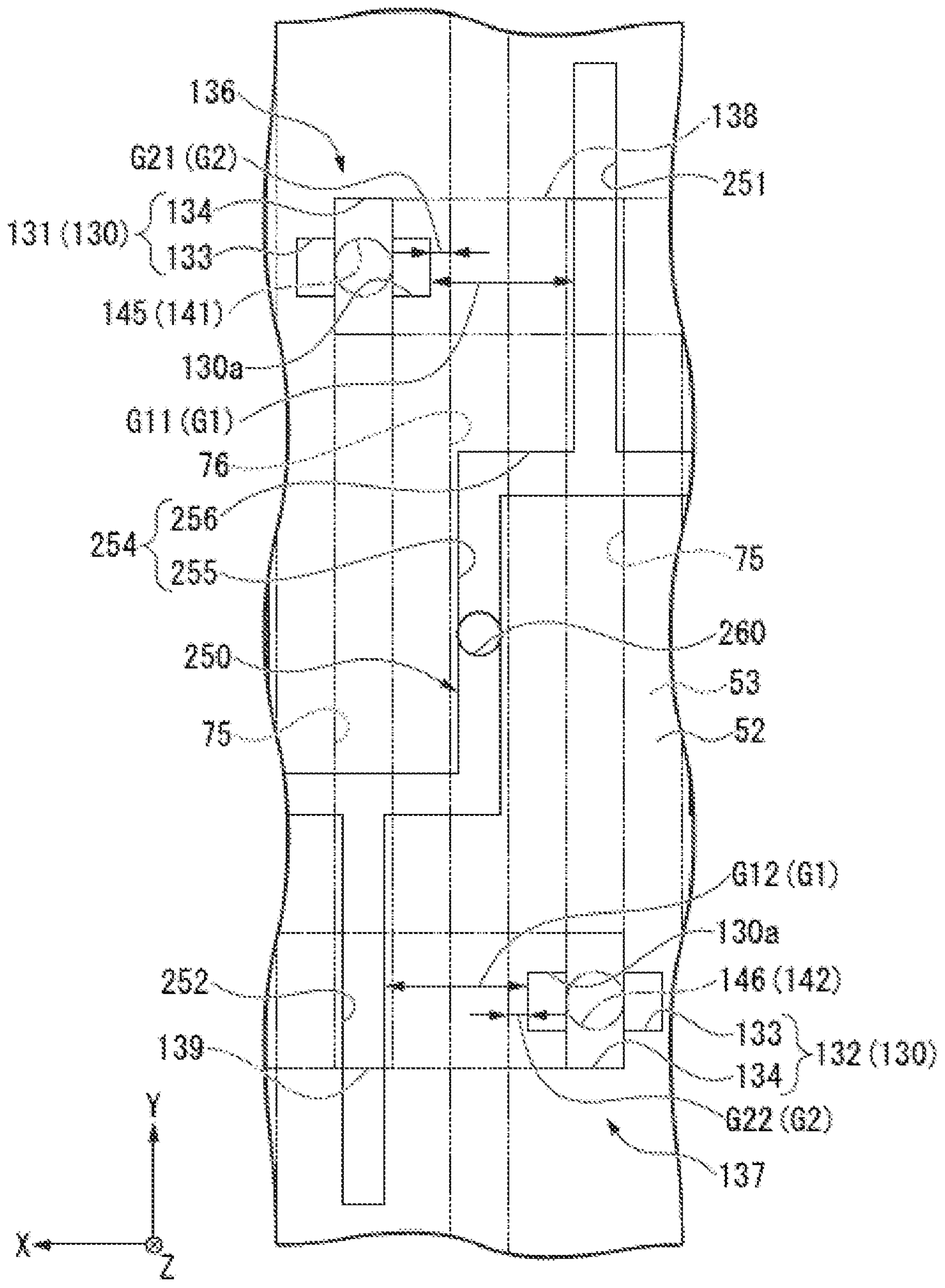
FIG. 15 is a diagram showing a part of FIG. 14 in an enlarged manner.

FIG. 15 is a diagram showing a part of FIG. 14 in an enlarged manner.

As shown in FIG. 15, each of the non-penetrating grooves 250 is formed so as to fulfill the following conditions with respect to the communication holes 130 located on the periphery thereof. When focusing attention on arbitrary one of the non-penetrating grooves 250, in each of the inter-communication hole regions 138, 139, a minimum gap G1 in the X direction between the non-penetrating groove 250 and the opening edge 130*a* of the communication hole 130 is larger than a minimum gap G2 in the X direction between the opening edge 130*a* of that communication hole 130 and the non-ejection channel 76. Specifically, in the first inter-communication hole region 138, a minimum gap G11 in the X direction between the non-penetrating groove 250 and the opening edge 130*a* of the first communication hole 131 is larger than a minimum gap G21 in the X direction between the opening edge 130*a* of the first communication hole 131 and the non-ejection channel 76. Further, in the second inter-communication hole region 139, a minimum gap G12 in the X direction between the non-penetrating groove 250 and the opening edge 130*a* of the second communication hole 132 is larger than a minimum gap G22 in the X direction between the opening edge 130*a* of the second communication hole 132 and the non-ejection channel 76.

As shown in FIG. 14, the penetrating holes 260 open in the coupling parts 254 of the non-penetrating grooves 250, and are communicated with the non-penetrating grooves 250, respectively. In the present embodiment, the penetrating holes 260 open in the intermediate parts 255 of the coupling parts 254. The penetrating holes 260 overlap the non-ejection-side penetrating parts 76*a* of the non-ejection channels 76, respectively, in the plan view. The penetrating holes 260 are communicated with the non-ejection-side penetrating parts 76*a* of the corresponding non-ejection channels 76, respectively, at the obverse surface side of the actuator plate 53. Thus, the penetrating holes 260 are communicated with the outside of the head chip 50 through the non-ejection channels 76, respectively. It should be noted that the penetrating holes 260 are each formed to have a circular shape in the plan view in the illustrated example, but the shape of each of the penetrating holes 260 is not particularly limited, and the penetrating holes 160 can each be formed to have, for example, a rectangular shape or an oval shape in the plan view.

It should be noted that although the formation method of the non-penetrating grooves 250 in the present embodiment is not particularly limited, it is possible to form the non-penetrating grooves 250 in a lump with, for example, the laser. On this occasion, regarding the transverse parts 251, 252 of the non-penetrating grooves 250, by performing scanning with the laser beam so as to reciprocate the laser beam in the Y direction, it is possible to form the transverse parts 251, 252 and the coupling part 254 to be coupled to the transverse parts 251, 252 in a lump.

As described above, in the present embodiment, in each of the inter-communication hole regions 138, 139, the minimum gap G1 in the X direction between the non-penetrating groove 250 and the opening edge 130*a* of the communication hole 130 is set larger than the minimum gap G2 in the X direction between the opening edge 130*a* of that communication hole 130 and the non-ejection channel 76. Thus, similarly to the first embodiment, it is possible to ensure the bonding margin between the intermediate plate 52 and the nozzle plate 51 in an area between the non-penetrating groove 250 and the communication hole 130. Therefore, it is possible to more surely bond the intermediate plate 52 and the nozzle plate 51 to each other.

Further, the non-penetrating grooves 250 each extend linearly in the Y direction as the transverse parts 251, 252 in the inter-communication hole regions 138, 139, respectively. According to this configuration, it is possible to enlarge the minimum gap G1 between both of the pair of communication holes 130 across the inter-communication hole regions 138, 139 and the non-penetrating groove 250 compared to when the non-penetrating grooves extend in a direction tilted with respect to the Y direction in the inter-communication hole regions. Therefore, it is possible to ensure the bonding margin between the intermediate plate 52 and the nozzle plate 51 in an area between the non-penetrating groove 250 and the communication hole 130.

It should be noted that although the single transverse part 251, 252 is disposed in each of the inter-communication hole regions 138, 139 in the second embodiment described above, this configuration is not a limitation. It is possible to adopt a configuration in which two transverse parts are disposed in each of the inter-communication hole regions 138, 139, and are formed to be coupled in end portion to each other outside the inter-communication hole regions 138, 139.

Further, although the coupling part 254 of the non-penetrating groove 250 is formed to have a bending part in the second embodiment described above, this configuration is not a limitation. For example, it is possible for the coupling part of the non-penetrating groove to extend linearly so as to couple the end portions of the transverse parts 251, 252 to each other.

It should be noted that the technical scope of the present disclosure is not limited to the embodiments described above, but a variety of modifications can be applied within the scope or the spirit of the present disclosure.

For example, in the embodiments described above, the description is presented citing the inkjet printer 1 as an example of the liquid jet recording device, but the liquid jet recording device is not limited to the printer. For example, a facsimile machine, an on-demand printing machine, and so on can also be adopted.

In the embodiments described above, the description is presented citing the configuration (a so-called shuttle machine) in which the inkjet heads move with respect to the recording target medium when performing printing as an example, but this configuration is not a limitation. The configuration related to the present disclosure can be adopted as the configuration (a so-called stationary head machine) in which the recording target medium is moved with respect to the inkjet head in the state in which the inkjet head is fixed.

In the embodiments described above, there is described the configuration in which the Z direction coincides with the vertical direction, but this configuration is not a limitation, and it is also possible to set the Z direction along the horizontal direction.

In the embodiments described above, the head chip of the side-shoot type is described, but this is not a limitation. For example, it is also possible to apply the present disclosure to a head chip of a so-called edge-shoot type for ejecting the ink from an end portion in the extending direction in the ejection channel.

In the embodiments described above, there is described the configuration in which the actuator plate 53, the intermediate plate 52, and the nozzle plate 51 are sequentially bonded to one another, but this configuration is not a limitation. It is possible to dispose another member between the actuator plate 53 and the intermediate plate 52, or between the intermediate plate 52 and the nozzle plate 51.

In the embodiments described above, there is described a case when the recording target medium P is paper, but this configuration is not a limitation. The recording target medium P is not limited to paper, but can also be a metal material or a resin material, and can also be food or the like.

In the embodiments described above, there is described the configuration in which the liquid jet head is installed in the liquid jet recording device, but this configuration is not a limitation. Specifically, the liquid to be jetted from the liquid jet head is not limited to what is landed on the recording target medium, but can also be, for example, a medical solution to be blended during a dispensing process, a food additive such as seasoning or a spice to be added to food, or fragrance to be sprayed in the air.

In the embodiments described above, there is disposed the single channel column, but it is possible to dispose two or more channel columns. In this case, it is possible to apply the configuration in the embodiments described above to each of the channel columns. Further, three or more communication hole groups and three or more nozzle arrays can be disposed for each of the channel columns.

In the embodiments described above, the non-penetrating grooves 150, 250 each extend continuously from the first inter-communication hole region 138 to the second inter-communication hole region 139, but this configuration is not a limitation. It is possible for the non-penetrating grooves to extend from an area between a pair of inter-communication hole regions toward only either one of the inter-communication hole regions.

Although the non-penetrating grooves 150, 250 extend with a constant width in the embodiments described above, this configuration is not a limitation. For example, the non-penetrating groove can be increased in width at a position where the penetrating hole opens.

Although the communication holes 130 in the intermediate plate 52 are each provided with the groove part 133 and the penetrating part 134 in the embodiments described above, the shape of the communication hole is not limited thereto. For example, the communication hole is not required to have the groove part, and the groove part can have an equivalent length to the penetrating part in the Y direction. Further, a shape of the opening edge of the communication hole on the obverse surface of the nozzle plate can be formed into, for example, a rectangular shape, a circular shape, or an oval shape.

Besides the above, it is arbitrarily possible to replace the constituent in the embodiments described above with a known constituent within the scope or the spirit of the present disclosure, and further, it is possible to arbitrarily combine the embodiments described above with each other.

What is claimed is:

1. A head chip configured to jet liquid, comprising:

an actuator plate having a channel column in which jet channels and non-jet channels extending in a first direction are alternately arranged in a second direction crossing the first direction so as to overlap each other in the first direction;

an intermediate plate which is overlapped with the actuator plate, and which has a plurality of columns of communication hole groups for each channel column, the communication hole group having communication holes individually communicated with the jet channels and arranged in a line in the second direction; and a jet orifice plate which is overlapped with the intermediate plate at an opposite side to the actuator plate, and is provided with jet orifices which are individually communicated with the communication holes, and from which the liquid contained in the jet channels is jetted, wherein the communication holes adjacent to each other in the second direction out of the communication holes included in the plurality of columns of communication hole groups are arranged so as to be shifted in the first direction from each other, the intermediate plate is provided with a non-penetrating groove which opens on a surface at a side of the jet orifice plate, and which is closed by the jet orifice plate, and a penetrating hole which is communicated with the non-penetrating groove, and which is communicated with an outside of the head chip through the non-jet channel, when defining a region between opening edges of a pair of the communication holes adjacent to each other in predetermined one of the communication hole groups in a surface at a side of the jet orifice plate in the intermediate plate as an inter-communication hole region, a part of the non-penetrating groove is located in the inter-communication hole region, and a minimum gap in the second direction between the opening edge of the communication hole and the non-penetrating groove in the inter-communication hole region is longer than a minimum gap in the second direction between the opening edge of the communication hole and the non-ejection channel.

2. The head chip according to claim 1, wherein the non-penetrating groove extends throughout an entire length in the first direction of the inter-communication hole region.

3. The head chip according to claim 1, wherein the non-penetrating groove extends continuously from one of the inter-communication hole regions corresponding respectively to a pair of the communication hole groups adjacent in the first direction to each other to another of the inter-communication hole regions.

4. The head chip according to claim 1, wherein the non-penetrating groove linearly extends throughout an entire length.

5. The head chip according to claim 1, wherein the non-penetrating groove linearly extends in the first direction in the inter-communication hole region.

6. A liquid jet head comprising the head chip according to claim 1.

7. A liquid jet recording device comprising the liquid jet head according to claim 6.

8. A method of manufacturing a head chip having an actuator plate having a channel column in which jet channels and non-jet channels extending in a first direction are alternately arranged in a second direction crossing the first direction so as to overlap each other in the first direction, an intermediate plate which is overlapped with the actuator plate, and which has a plurality of columns of communication hole groups for each channel column, the communication hole group having communication holes individually communicated with the jet channels and arranged in a line in the second direction, and a jet orifice plate which is overlapped with the intermediate plate at an opposite side to the actuator plate, and is provided with jet orifices which are individually communicated with the communication holes, and from which a liquid contained in the jet channels is jetted, wherein the communication holes adjacent to each other in the second direction out of the communication holes included in the plurality of columns of communication hole groups are arranged so as to be shifted in the first direction from each other, the method comprising:

a non-penetrating groove formation step of providing a non-penetrating groove to the intermediate plate, the non-penetrating groove opening on a surface at a side of the jet orifice plate and being closed by the jet orifice plate; and a penetrating hole formation step of providing a penetrating hole to the intermediate plate, the penetrating hole being communicated with the non-penetrating groove, and being communicated with an outside of the head chip through the non-jet channel, wherein when defining a region between opening edges of a pair of the communication holes adjacent to each other in predetermined one of the communication hole groups in a surface at a side of the jet orifice plate in the intermediate plate as an inter-communication hole region, in the non-penetrating groove formation step, a part of the non-penetrating groove is formed in the inter-communication hole region, and a minimum gap in the second direction between the opening edge of the communication hole and the non-penetrating groove in the inter-communication hole region is set longer than a minimum gap in the second direction between the opening edge of the communication hole and the non-ejection channel.

9. The method of manufacturing the head chip according to claim 8, further comprising an intermediate plate bonding step of bonding the intermediate plate to the actuator plate, wherein the penetrating hole formation step is performed after the intermediate plate bonding step.

10. The method of manufacturing the head chip according to claim 8, further comprising an intermediate plate bonding step of bonding the intermediate plate to the actuator plate, wherein the intermediate plate bonding step is performed after the non-penetrating groove formation step.

* * * * *